(12) United States Patent
Kiest, Jr.

(10) Patent No.: US 10,436,374 B2
(45) Date of Patent: Oct. 8, 2019

(54) GROOVED SEALING MEMBER FOR SEALING PIPES AND OTHER UNDERGROUND STRUCTURES AND METHOD OF USING

(71) Applicant: LMK Technologies LLC, Ottawa, IL (US)

(72) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 0 days.

(21) Appl. No.: 15/728,057

(22) Filed: Oct. 9, 2017

(65) Prior Publication Data

US 2019/0107241 A1   Apr. 11, 2019

(51) Int. Cl.
| | |
|---|---|
| *F16L 55/16* | (2006.01) |
| *F16L 55/165* | (2006.01) |
| *F16L 55/179* | (2006.01) |
| *F16L 55/26* | (2006.01) |
| *E03F 3/00* | (2006.01) |
| *E02D 29/12* | (2006.01) |
| *E03F 5/02* | (2006.01) |
| *F16L 101/18* | (2006.01) |
| *E03F 3/06* | (2006.01) |

(52) U.S. Cl.
CPC ........ *F16L 55/1654* (2013.01); *E02D 29/125* (2013.01); *E02D 29/128* (2013.01); *E03F 3/00* (2013.01); *F16L 55/1656* (2013.01); *F16L 55/179* (2013.01); *F16L 55/265* (2013.01); *E03F 5/025* (2013.01); *E03F 2003/065* (2013.01); *F16L 55/1651* (2013.01); *F16L 2101/18* (2013.01)

(58) Field of Classification Search
CPC combination set(s) only.
See application file for complete search history.

(56) References Cited

U.S. PATENT DOCUMENTS 3,707,850 A * 1/1973 Connell ................ F17C 3/005
   405/56
5,268,137 A * 12/1993 Scott ................ B28B 19/0061
   249/112

(Continued)

OTHER PUBLICATIONS

International Search Report PCT/US18/54167—Dec. 10, 2018.

*Primary Examiner* — Kyle Armstrong
(74) *Attorney, Agent, or Firm* — Nyemaster Goode, PC

(57) ABSTRACT

An apparatus and method is provided for repairing an underground structure such as a pipe or manhole. The apparatus includes a liner assembly made of resin absorbent material. Some embodiments may further include a bladder assembly to help position the liner and press the liner against the walls of the underground structure. A sealing member is positioned in the underground structure. In some embodiments the sealing member is a separate member made from a compressible material, an absorbent material, or a hydrophilic or hydrophobic material. In other embodiments the sealing member is a portion of the liner assembly. The sealing member includes one or more channels adapted to receive a semi-liquid such as a hydrophilic or hydrophobic paste or grout. The semi-liquid is capable of swelling in response to being exposed to another liquid, such as water, and forms a seal between the liner assembly and the host pipe/manhole.

14 Claims, 21 Drawing Sheets

(56) References Cited

U.S. PATENT DOCUMENTS

| | | | | |
|---|---|---|---|---|
| 5,568,995 | A * | 10/1996 | Beamer | E03F 3/046 |
| | | | | 404/4 |
| 5,573,351 | A * | 11/1996 | Beamer | E03F 3/046 |
| | | | | 249/11 |
| 5,816,293 | A | 10/1998 | Kiest | |
| 6,068,725 | A * | 5/2000 | Tweedie | F16L 55/179 |
| | | | | 138/97 |
| 6,484,757 | B1 | 11/2002 | Warren | |
| 6,997,260 | B1 * | 2/2006 | Trader | E21B 29/10 |
| | | | | 138/99 |
| 7,481,246 | B2 * | 1/2009 | Kamiyama | F16L 55/179 |
| | | | | 138/97 |
| 7,942,167 | B1 * | 5/2011 | Llewellyn | F16L 55/1656 |
| | | | | 138/97 |
| 7,975,726 | B2 | 7/2011 | Kiest | |
| 7,987,873 | B2 | 8/2011 | Kiest | |
| 8,240,341 | B2 | 8/2012 | Kiest | |
| 8,640,737 | B2 | 2/2014 | Kiest | |
| 8,715,800 | B2 | 5/2014 | Kiest | |
| 8,821,068 | B2 | 9/2014 | Kiest | |
| 9,169,957 | B2 | 10/2015 | Kiest | |
| 9,791,089 | B2 | 10/2017 | Kiest | |
| 2008/0029177 | A1 * | 2/2008 | Kamiyama | F16L 55/179 |
| | | | | 138/98 |
| 2018/0031167 | A1 | 2/2018 | Trapani et al. | |
| 2018/0283174 | A1 * | 10/2018 | Warren | E21D 11/40 |

\* cited by examiner

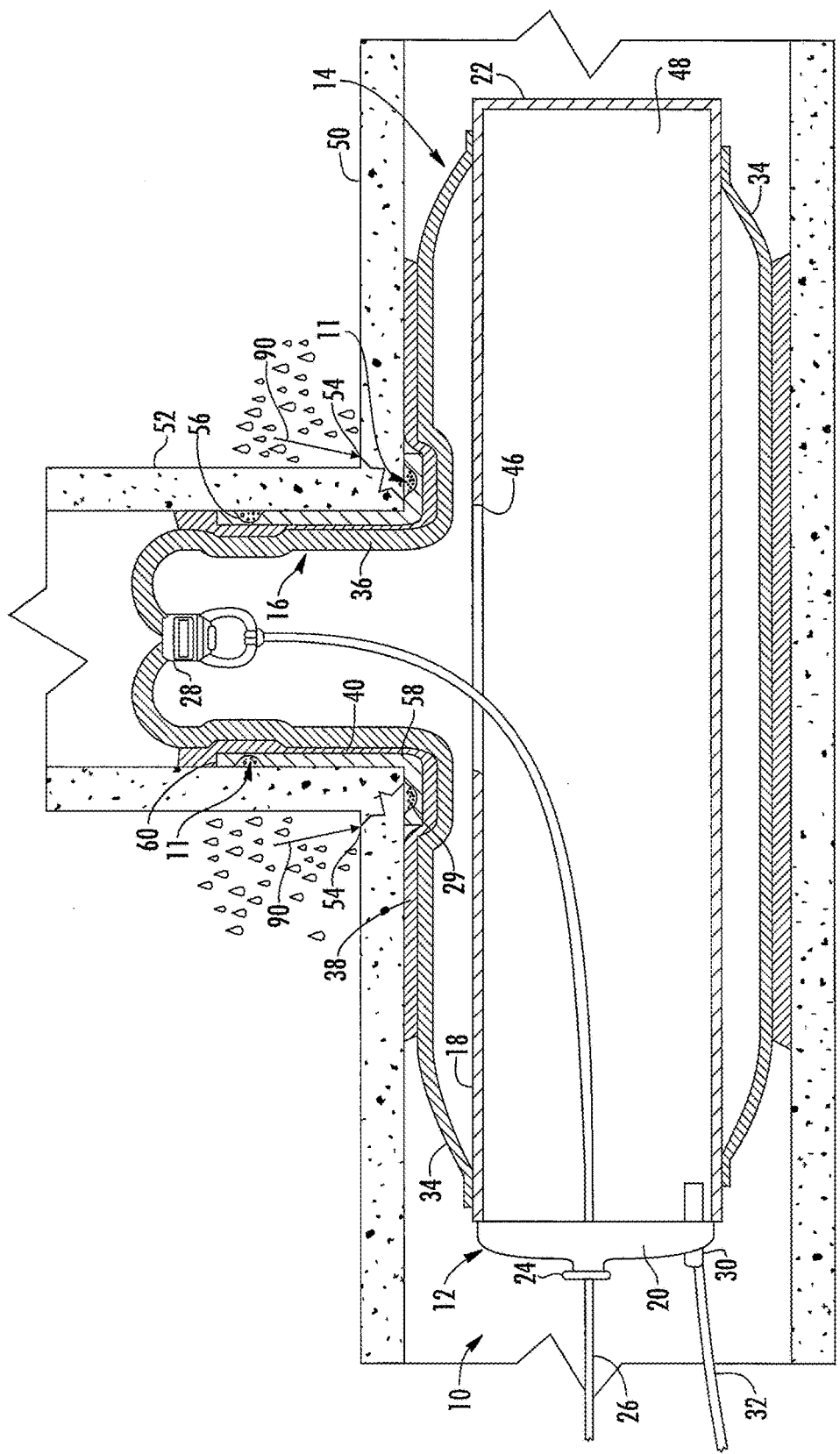

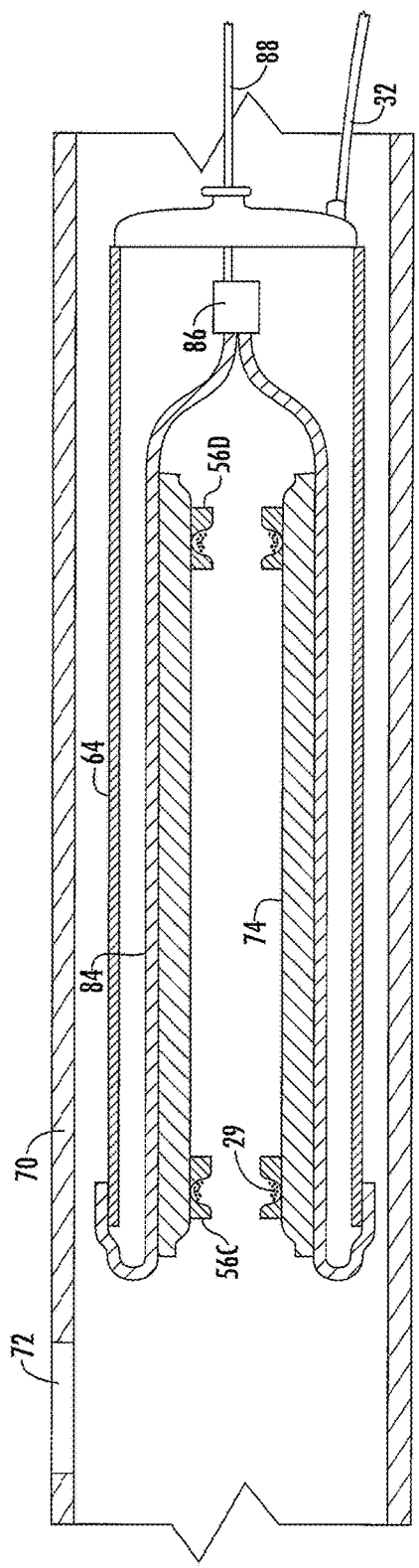
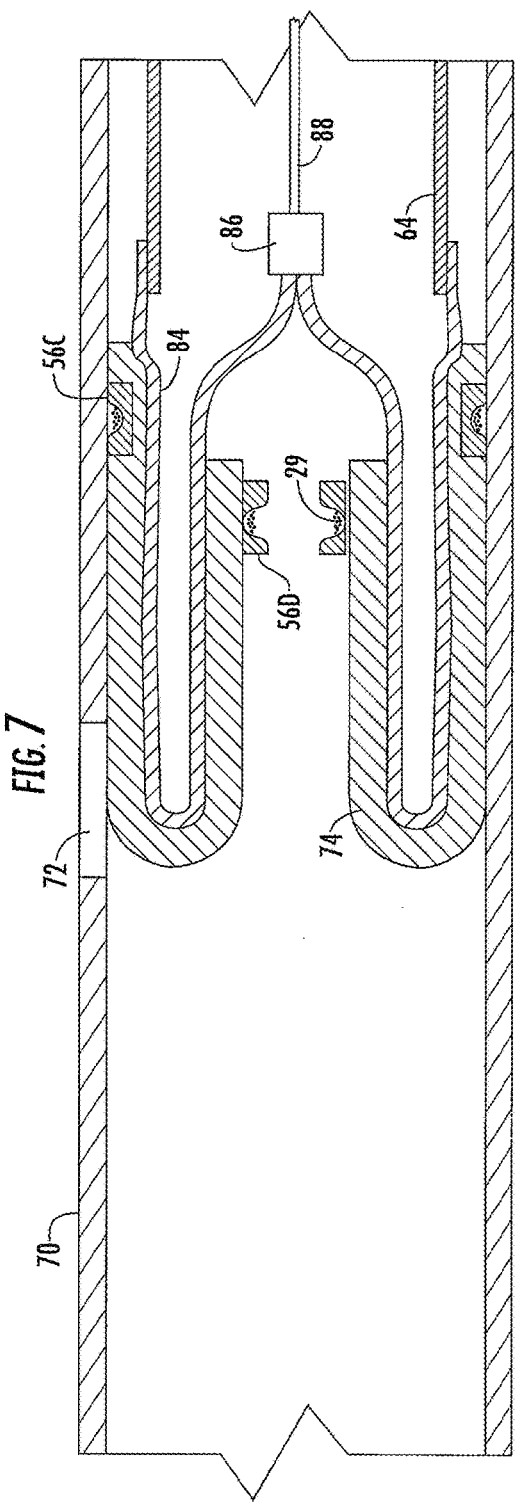
FIG. 7
FIG. 8

GROOVED SEALING MEMBER FOR SEALING PIPES AND OTHER UNDERGROUND STRUCTURES AND METHOD OF USING

FIELD OF THE INVENTION

The invention relates generally to an apparatus and method for repairing or sealing an underground structure such as a pipe or a manhole. More particularly, but not exclusively, the invention relates to a kit, apparatus, and method to seal a pipe, manhole, or other underground structure and/or a junction between two underground structures.

BACKGROUND

As the infrastructure of major cities and towns in the developed world age, the sewer systems weaken. Pipe degradation, system blockage, water infiltration, and sewer leakage are major problems that aging sewer systems experience. As these problems persist, the sewer system may eventually experience total failure and entire sections of the sewer system may collapse. As a result, sinkholes may form and sewers may back up into homes and places of business. One method of addressing this critical infrastructure problem is the use of pipe lining techniques to rehabilitate existing sewer systems.

Cured-in-place pipelining is one such technique that includes rehabilitating an existing sewer system by creating a new wall within an existing pipe or manhole. A liner, impregnated with a resinous material capable of curing and hardening, is inverted or pulled into a damaged structure (typically a pipe or manhole). The liner is pressed against the wall of the existing structure, and the resinous material is allowed to cure and harden. The result is a replacement structure wall having the older wall or "host pipe" on the exterior. The cured-in-place liner acts to alleviate the problems caused by structural defects and blockages in the existing sewer system. Even in sewer systems where the main pipes or manholes have been rehabilitated with a cured-in-place pipe or other pipe liners, problems still arise. Some of those problems are caused by shrinkage of the liner and unsealed areas at the pipe ends, the pipe junctions, or the manholes and other adjoining structures.

Shrinkage of a liner after installation presents a problem for the longevity and effectiveness of a sewer system or other pipeline. Most resinous materials experience some shrinkage after installation within an existing pipe or manhole. Once the liner material has been installed, an annulus between the host pipe and the liner is created due to this shrinkage of the resinous material or due to surface irregularities of the structure's wall. The amount of shrinkage by a liner depends on the materials used, the thickness of the liner, the depth of the structure, the ambient temperatures, as well as several other factors. This shrinkage allows water and debris to enter into the sewer system from the ground surrounding the pipes, allows effluent to escape into the ground surrounding the pipes, and allows roots from surrounding vegetation to enter the annulus between the host structure and the liner.

In sewer systems where the main pipes have been rehabilitated with a cured-in-place pipe, unsealed connections at service and manhole junctions create problems. An unsealed connection is generally a product of installing a pipe liner within the main pipe, then using a cutting tool on the pipe liner at the connection to reinstate service. Current methods are described for example in U.S. Pat. Nos. 5,587,126; 6,641,688; and 7,131,791, which are all incorporated by reference in their entirety. Once service is reinstated to the service pipes by the use of the cutting tool, the service pipes may still include leaks, cracks or other structural defects that allow infiltration or exfiltration of fluids or sediment at or around the junction of the main and service pipe. The service pipe and junction with the main pipe may be further sealed or rehabilitated by installing a hydrophilic or hydrophobic sealing member. U.S. Pat. No. 7,975,726, which is incorporated by reference in its entirety, discloses applying a paste in the form of a ring or band to the liner to help prevent infiltration or exfiltration of fluids or sediment. One problem with using these types of materials is that the paste is compressed against the pipe by the expanding liner or bladder before it cures, which disperses and thins the paste and reduces the effectiveness of the sealing member.

Similarly, once the main pipe and the junctions of the main and service pipes have been rehabilitated and sealed, the manhole and the junction of the main pipe and the manhole remain at risk for allowing unwanted infiltration or exfiltration of fluids and sediment. Conventional manholes include a lower or bottom pan, a barrel with a diameter no greater than the adjacent pan, a concentric or eccentric cone extending upwardly from the barrel, one or more adjusting rings to adjust the overall height of the manhole, and a casting frame on top of the adjusting rings to support a lid at an elevation substantially level with the surrounding pavement. Manholes may be used for many purposes, including acting as catch basins for storm water drainage, providing access to buried pipelines, junction chambers at the intersection of sewer lines, and constructing reservoirs or wetwells for pump stations. As such, the manhole structure is a critical point to seal within the sewer system because it is an area that is inundated with fluids and sediment. The issue of sealing a manhole utilizing cured-in-place pipelining techniques has been previously addressed in U.S. Pat. No. 7,670,086, which is hereby incorporated by reference in its entirety. However, unless the junction between the manhole and sewer pipe is properly sealed, ground water will continue to run along the main pipe until it can enter the sewer system where the main pipe joins the manhole. Additionally, in a conventional manhole, the areas between the bottom pan, the barrel, the cone, and the adjusting rings are prone to experiencing water infiltration and exfiltration even when a manhole liner has been installed. Some prior methods disclose placing a hydrophobic or hydrophilic sealing member at the junction between the pipe and the manhole and/or within the manhole to help prevent water infiltration. U.S. Pat. No. 8,640,737, which is incorporated by reference in its entirety, discloses applying a liquid or semi-liquid sealing member into the manhole adjacent to an area of the manhole prone to water infiltration. The liquid or semi-liquid sealing member may be a hydrophilic or hydrophobic grout or paste. One problem with using these types of materials is that the liquid or semi-liquid sealing member is compressed against the pipe by the expanding liner or bladder before it cures, which disperses and thins the paste and reduces the effectiveness of the sealing member.

Therefore, a need in the art exists for an apparatus and method for more effectively sealing underground structures such as pipes and manholes and junctions between underground structures using a liquid or semi-semi-liquid such as a hydrophilic or hydrophobic grout or paste.

SUMMARY

It is therefore an object, feature, and/or advantage of the present invention to provide an improved apparatus and method for repairing or sealing underground structures such as pipes and manholes, or the junction between two underground structures which overcomes deficiencies in the prior art.

It is another object, feature, and/or advantage of the present invention to provide an improved apparatus and method for repairing or sealing a pipe, a manhole, or the junction between a pipe and an underground structure using a sealing member having a groove, channel, cavity, or the like (collectively a "channel") adapted to receive a semi-liquid in conjunction with a liner.

It is another object, feature, and/or advantage of the present invention to provide an improved apparatus and method for repairing or sealing a pipe, a manhole, or the junction between a pipe and an underground structure using a liner having a channel adapted to receive a semi-liquid (where the liner is the sealing member).

It is another object, feature, and/or advantage of the present invention to provide an apparatus and method for repairing a pipe, a manhole, or the junction between a pipe and a manhole which is economical to manufacture, easy to install, and durable in use.

It is another object, feature, and/or advantage of the present invention to provide a sealing member or liner having a channel adapted to receive a semi-liquid for use in conjunction with a pipe or manhole liner to repair or seal an area prone to experiencing water infiltration where the sealing member may be a compressible material, an absorbent material, or a hydrophilic or hydrophobic material.

These and/or other objects, features, and advantages of the present invention will be apparent to those skilled in the art. The present invention is not to be limited to or by these objects, features and advantages, and no single embodiment need exhibit every object, feature, and/or advantage.

According to one feature of the present invention, an apparatus is provided for repairing an underground structure such as a pipe or manhole or the junction between two underground structures. The apparatus includes a liner assembly made of resin absorbent material. Some embodiments may further include a bladder assembly. A sealing member is positioned in the underground structure at the area to be sealed. The sealing member is generally the same diameter of the pipe, manhole, or junction to be sealed. In some embodiments the sealing member is a separate member made from a rigid material, a compressible material, an absorbent material, or a hydrophilic or hydrophobic material. In other embodiments the sealing member is a portion of the liner assembly. The sealing member includes one or more channels adapted to receive a semi-liquid such as a hydrophilic or hydrophobic paste or grout. The channel(s) extends around the entire outer surface of the sealing member, forming a continuous groove. The semi-liquid is capable of swelling in response to being exposed to another liquid, such as water, and forms a seal between the liner assembly and the host pipe/manhole. The apparatus can be used in applications where the liner assembly is inverted into the lateral pipe line or in so-called "pull-in-place" applications.

According to one feature of the present invention, an apparatus is provided for repairing the juncture between a main pipe line and a lateral pipe line. The apparatus includes a liner assembly having a main liner member and a lateral liner tube made of resin absorbent material. Some embodiments may further include a bladder assembly having a main bladder tube and a lateral bladder tube to help position the liner assembly against the walls of the pipes. A sealing member such as a gasket engages a portion of the main liner member and surrounds a portion of the lateral liner tube and is positioned between the host pipes and the liner assembly in operation. The sealing member may be constructed of or impregnated with a hydrophilic or hydrophobic material. The sealing member may have a brim portion adapted to engage a portion of the main pipe and a tubular portion adapted to engage the lateral pipe. The sealing member includes one or more channels in its outer surface adapted to receive a semi-liquid such as a hydrophilic or hydrophobic paste or grout. The channel extends around the entire outer surface of the sealing member, forming a continuous groove. The channel is maintained as the liner is pressed against the sealing member. This prevents the semi-liquid from being exposed to the pressure from the liner and allows the semi-liquid to remain in the channel. In some embodiments, one channel many be in the brim portion of the sealing member and another channel may be in the tubular portion of the sealing member. The semi-liquid is capable of swelling in response to being exposed to another liquid, such as water, and forms a seal between the liner assembly and the host pipes near the juncture between the host pipes. The apparatus can be used in applications where the lateral liner is inverted into the lateral pipe line or in so-called "pull-in-place" applications. In a pull-in-place application, both the main liner and lateral liner are moved through the main pipe line to a position where the lateral liner ultimately extends inside the lateral pipe line and the main liner is positioned in the main pipe line near the access opening to the lateral pipe line.

According to another feature of the present invention, an apparatus is provided for repairing the juncture between a main pipe line and a lateral pipe line. The apparatus includes a liner assembly having a main liner member and a lateral liner tube made of resin absorbent material. Some embodiments may further include a bladder assembly having a main bladder tube and a lateral bladder tube to help position the liner assembly against the walls of the pipes. A sealing member is positioned on the main liner portion of a main/lateral liner. The sealing member may be in the form of a ring or band which surrounds the opening between the main and lateral liners and is disposed between the main pipe line and the liner around the periphery of the opening between the main and lateral pipes to effectively seal against entry of ground water at the pipe junction. The sealing member includes one or more channels in its outer surface adapted to receive a semi-liquid such as a hydrophilic or hydrophobic paste or grout. The channel extends around the entire outer surface of the sealing member, forming a continuous groove. The channel is maintained as the liner is pressed against the sealing member. This prevents the semi-liquid from being exposed to the pressure from the liner and allows the semi-liquid to remain in the channel. The semi-liquid is capable of swelling in response to being exposed to another liquid, such as water, and forms a seal between the liner assembly and the host pipes at the juncture between the host pipes. Some embodiment further include a second sealing member in the form of a band similar to the first sealing member. The second sealing member is placed in the lateral pipe. The second sealing member may be attached to the lateral liner tube and inverted or pulled into the lateral pipe. This apparatus is suitable for use in both inversion-style applications and pull-in-place applications.

According to yet another feature of the present invention, an apparatus is provided for repairing a damaged section of pipe. The apparatus includes a main liner member made of resin absorbent material. Some embodiments may further include a main bladder tube to help position the main liner member in the pipe. The apparatus includes one or more sealing members which may be in the form of a ring or band connected to the lining surface of the liner. The sealing members are spaced apart from one another a sufficient distance so as to create a seal between the host pipe and the liner on opposite sides of the damaged portion of the pipe. The sealing members include one or more channels in their outer surface adapted to receive a semi-liquid such as a hydrophilic or hydrophobic paste or grout. The channel extends around the entire outer surface of the sealing member, forming a continuous groove. The channel is maintained as the liner is pressed against the sealing member. This prevents the semi-liquid from being exposed to the pressure from the liner and allows the semi-liquid to remain in the channel. The semi-liquid is capable of swelling in response to being exposed to another liquid, such as water, and forms a seal between the liner and the host pipes. This apparatus is suitable for use in both inversion-style applications and pull-in-place applications. In embodiments where the liner is inverted, the sealing members are positioned on the outside of the liner between the host pipe and the liner. When the liner is inverted, the opening of each cavity is positioned to be facing the wall of the host pipe thereby exposing the liquid paste or grout to water or other liquid causes it to swell, thereby creating the desired seal.

According to one aspect of the present invention, an assembly for sealing a pipe end is provided. The assembly includes a sealing member having an outer profile approximately equal to a pipe diameter and a pipe liner. In some embodiments the assembly may further include a mechanical fastener adapted to retain the sealing member against a wall of the pipe end. The sealing member may be a tubular sleeve that is constructed of or impregnated with a hydrophilic or hydrophobic material. The sealing member includes one or more channels in its outer surface adapted to receive a semi-liquid such as a hydrophilic or hydrophobic paste or grout. The channel extends around the entire outer surface of the sealing member, forming a continuous groove. The channel is maintained as the liner is pressed against the sealing member. This prevents the semi-liquid from being exposed to the pressure from the liner and allows the semi-liquid to remain in the channel. The semi-liquid is capable of swelling in response to being exposed to another liquid, such as water, and forms a seal between the liner assembly and the host pipes at the juncture between the host pipe and the manhole. In one embodiment, the sealing member is a hydrophilic neoprene rubber having a hardness of less than 62 Shore A Durometer Scale. The hydrophilic material may be such that the sealing member is collapsible, but capable of being placed back into an initial tubular conformation. In embodiments where the sealing member is a tubular sleeve, the tubular sleeve may include a flange attached to at least a portion of an end thereof. A pipe liner may be placed over the sealing member using inversion or pull-in-place methods.

According to another aspect of the present invention, an assembly for sealing a manhole is provided. The assembly includes at least one sealing member having an outer profile approximately equal to at least one manhole inner diameter and a manhole liner. In some embodiments the assembly further includes a mechanical fastener adapted to retain the sealing member against a wall of the manhole. The sealing member may be constructed of or impregnated with a hydrophilic or hydrophobic material. The sealing member includes one or more channels in its outer surface adapted to receive a semi-liquid such as a hydrophilic or hydrophobic paste or grout. The channel extends around the entire outer surface of the sealing member, forming a continuous groove. The channel is maintained as the liner is pressed against the sealing member. This prevents the semi-liquid from being exposed to the pressure from the liner and allows the semi-liquid to remain in the channel. The semi-liquid is capable of swelling in response to being exposed to another liquid, such as water, and forms a seal between the manhole liner and the manhole wall. In one embodiment, the sealing member is a hydrophilic neoprene rubber having a hardness of less than 62 Shore A Durometer Scale. In other embodiments, the sealing member is an absorbent material capable of receiving a grout or resinous material capable of sealing a crack or fissure within a structure. The grout or resinous material capable of sealing a crack or fissure within a structure may be hydrophilic or hydrophobic. The sealing member may be a band, ring, or tubular sleeve made of a material that is collapsible, but capable of being placed back into an initial tubular conformation against the wall of the manhole. A manhole liner may be placed over the sealing member using inversion or pull-in-place methods.

According to another aspect of the present invention, an assembly similar to any of the assemblies described above, except the sealing member is a portion of the liner itself. In other words, the one or more channels are formed in a portion of the liner and there is no separate sealing member. The liner(s) include one or more channels adapted to receive a semi-liquid such as a hydrophilic or hydrophobic paste or grout. The channels may be formed by securing a first extra layer of liner/felt material to a first portion of the liner and a second extra layer of liner/felt material to a second portion of the liner. The two extra layers are spaced a short distance apart to create a channel therebetween. The extra layers of liner material allow the channel to be maintained as the liner is pressed against the pipe/manhole wall. The channel extends around the entire outer surface of the sealing member, forming a continuous groove. The channel prevents the semi-liquid from being exposed to the pressure and allows the semi-liquid to remain in the channel. The semi-liquid is capable of swelling in response to being exposed to a liquid, such as water, and forms a seal between the liner(s) and the host pipes and/or manhole.

According to another aspect of the present invention, methods for using the assemblies set forth above for sealing one or more of the underground structures set forth above. The methods include providing the assembly and placing the sealing member and liner assembly within the pipe or manhole using inversion or pull-in-place methods. The liner assembly is impregnated with a material capable of curing and hardening. In some embodiments, the sealing member is secured to the liner assembly before the liner assembly is placed in the pipe or manhole. A semi-liquid such as a hydrophilic or hydrophobic paste or grout is introduced into the channel in the sealing member. The semi-liquid is capable of swelling in response to being exposed to another liquid, such as water, and forms a seal between the manhole liner and the manhole wall. The outer surface of the sealing member is placed against the wall of the pipe or manhole. The pipe or manhole liner is placed in the pipe or manhole and against an inner wall of the sealing member using inversion or pull-in-place methods. In embodiments using a bladder, the bladder assembly is then inflated to help position the sealing member and liner assembly against the wall of the structure as the resin in the liner cures and hardens. The bladder assembly may be removed from the pipe or manhole or it may remain in the structure after the liner has cured and hardened.

BRIEF DESCRIPTION OF THE DRAWINGS

FIG. 2a is a sectional view similar to FIG. 2, but showing the assembly in its inflated position.

FIG. 7 is a sectional view of a pipe line showing an embodiment of the present invention where a sealing member has a channel adapted to receive a semi-liquid such as a hydrophilic or hydrophobic paste or grout.

FIG. 8 is a sectional view similar to FIG. 7, showing the liner in a partially inverted position.

DETAILED DESCRIPTION

Figure 1:
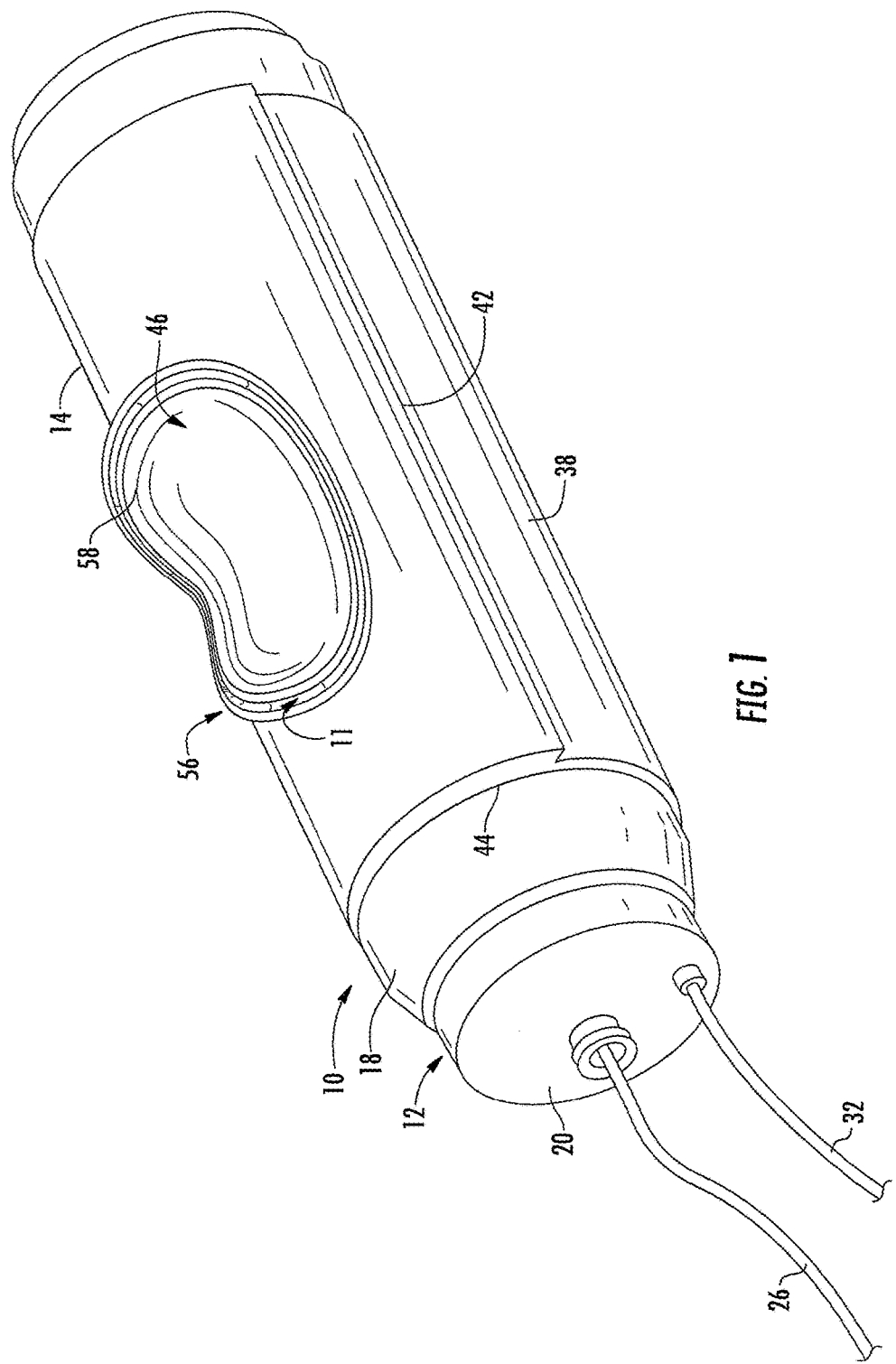
FIG. 1 is a perspective view of a repair assembly for repairing a lateral pipe line and a main pipe line.

The invention generally relates to methods and apparatuses for more effectively sealing underground structures such as pipes and manholes, or the junction between underground structures. The invention includes a sealing member having a groove, channel, or cavity (collectively a "channel") adapted to receive a semi-liquid such as a hydrophilic or hydrophobic paste or grout. The sealing member may be constructed of or impregnated with a hydrophilic or hydrophobic material. In some embodiments the sealing member is a gasket, band, or tubular sleeve positioned between the liner assembly and the wall of the pipe or manhole. In other embodiments the sealing member is the liner itself. In these embodiments a portion of the liner has a channel adapted to receive a semi-liquid such as a hydrophilic or hydrophobic paste or grout but no separate sealing member is used. One such hydrophilic paste is distributed by OCM, Inc. in Vernon Hills, Ill. under the trademark ADEKA ULTRA SEAL, part number P-201. This product is a single component hydrophilic paste used in water stop repairs. The paste may also be made from a material that is not hydrophilic yet forms an impermeable compressible gasket when cured. One such impermeable compressible paste is distributed by Manus Products, Inc. in Waconia, Minn. The various embodiments are described below in more detail.

FIGS. 1-4 show an embodiment having a repair assembly which is generally designated by the numeral 10. Repair assembly 10 includes a launcher device 12 having mounted thereto a T-shaped or Y-shaped liner assembly 14. In some embodiments the repair assembly 10 also houses a T-shaped or Y-shaped bladder assembly 16, however, the bladder assembly 16 is not necessary in all embodiments. In embodiments without a bladder, the liner may have a fluid-impermeable coating on one side, allowing the main liner to inflate without the use of a bladder. In the particular configuration shown in FIGS. 1-3, the liner assembly 14 and bladder assembly 16 are T-shaped, but they can also be Y-shaped (FIG. 4) to accommodate a lateral pipe line that intersects with a main pipe line at an oblique angle.

Launcher device 12 includes side walls 18, an end cap 20 and an end wall 22, all of which form a launcher device cavity 48. End cap 20 includes a line inlet 24 through which a line 26 extends. Line 26 is attached to a closed bladder tube end 28. Also extending through end cap 20 is an air inlet 30 which is connected to an air hose 32. T-shaped or Y-shaped bladder assembly 16 includes a main bladder tube 34 and a lateral bladder tube 36. Similarly, the T-shaped or Y-shaped liner assembly 14 includes a main liner member 38 and a lateral liner tube 40. The bladder assembly 16 is fitted on the interior of the liner assembly 14.

Figure 2:
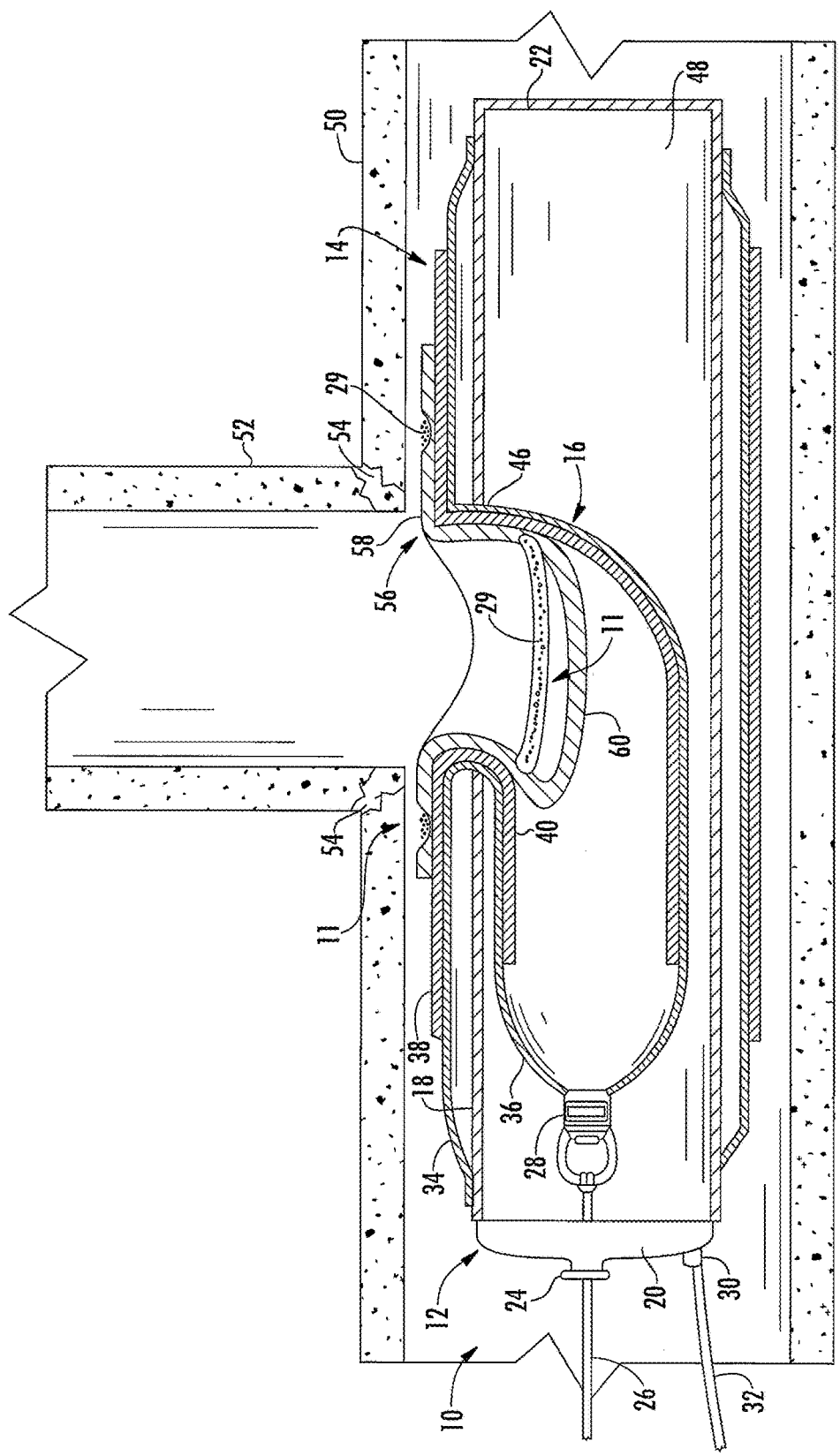
FIG. 2 is a sectional view of a main pipe line and a lateral pipe line showing an embodiment of the present invention where a brim-style gasket sealing member has a channel adapted to receive a semi-liquid such as a hydrophilic or hydrophobic paste or grout.

As can be seen in FIG. 1, the main liner member 38 is comprised of what is initially a flat sheet of material which is wrapped around the outside of the main bladder tube 34 and the launcher device 12. The main liner member 38 includes overlapping edges 42, 44. The launcher device 12 includes a launcher device opening 46, and the lateral liner tube 40 is contained within the launcher device cavity 48 as shown in FIG. 2. Similarly, the lateral bladder tube 36 is contained within the cavity 48 and surrounds the lateral liner tube 40. Both the main liner member 38 and the lateral liner tube 40 are comprised of a felt layer, which is the lining surface that contacts the interior surface of the host pipe, and a polymer coating is on the opposite surface.

FIGS. 2 and 2a show the repair assembly 10 within a main pipe line 50 which is connected to a lateral pipe line 52. The damaged portion 54 is shown needing repair. Ground water from outside the lateral pipe line 52 and the main pipe line 50 will seep through the damaged portion 54 and enter the interior of the main pipe line 50 and the lateral pipe line 52.

In order to help prevent this seepage of ground water, a sealing member 56 is positioned about a portion of the liner assembly 14. The sealing member 56 includes a tubular portion 60 that extends at least partially within the lateral liner tube 40 and a brim or flange portion 58 that extends outwardly about the periphery of one end of the tubular portion 60. The flange portion 58 of the sealing member 56 is preferably attached to the main liner member 38 around the juncture between the main liner member 38 and the lateral liner tube 40 so as to maintain the sealing member 56 in proper position as the repair assembly 10 is positioned for operation. The sealing member 56 is preferably made of or impregnated with a hydrophilic material capable of swelling in response to being exposed to water or other liquid. However, other materials for the sealing member 56 found suitable include neoprene rubber, other similar gasket materials such as urethane or silicone rubber, and like impermeable compressible materials. It should be noted that although the sealing member 56 may be made from a compressible material, it does not compress under the pressure from the expanding liner or bladder to significantly flatten or deform the channel(s) 11 described below. Although the precise dimensions of the sealing member 56 are not necessarily critical to the present invention, a tubular portion 60 having a length of approximately six inches and a flange portion 58 having a diameter of approximately twelve inches has been found suitable for most sewer pipe applications.

Figure 3:
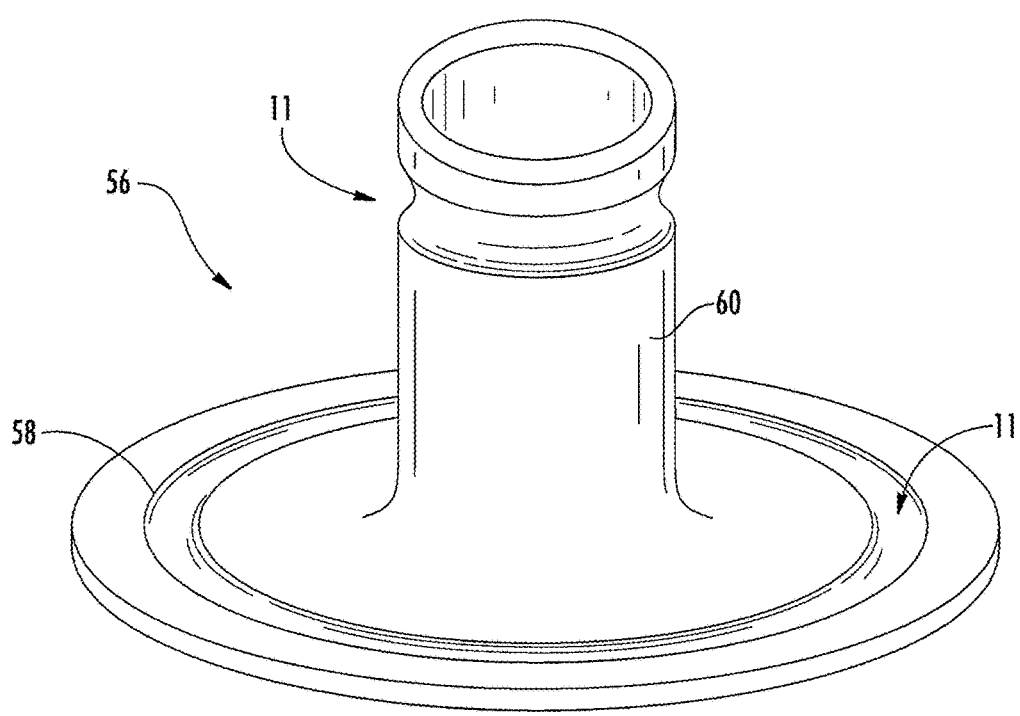
FIG. 3 is a perspective view of a brim-style sealing member used with the embodiment of FIG. 2 and configured for installation at a tee junction prior to installation within a pipe.
Figure 4:
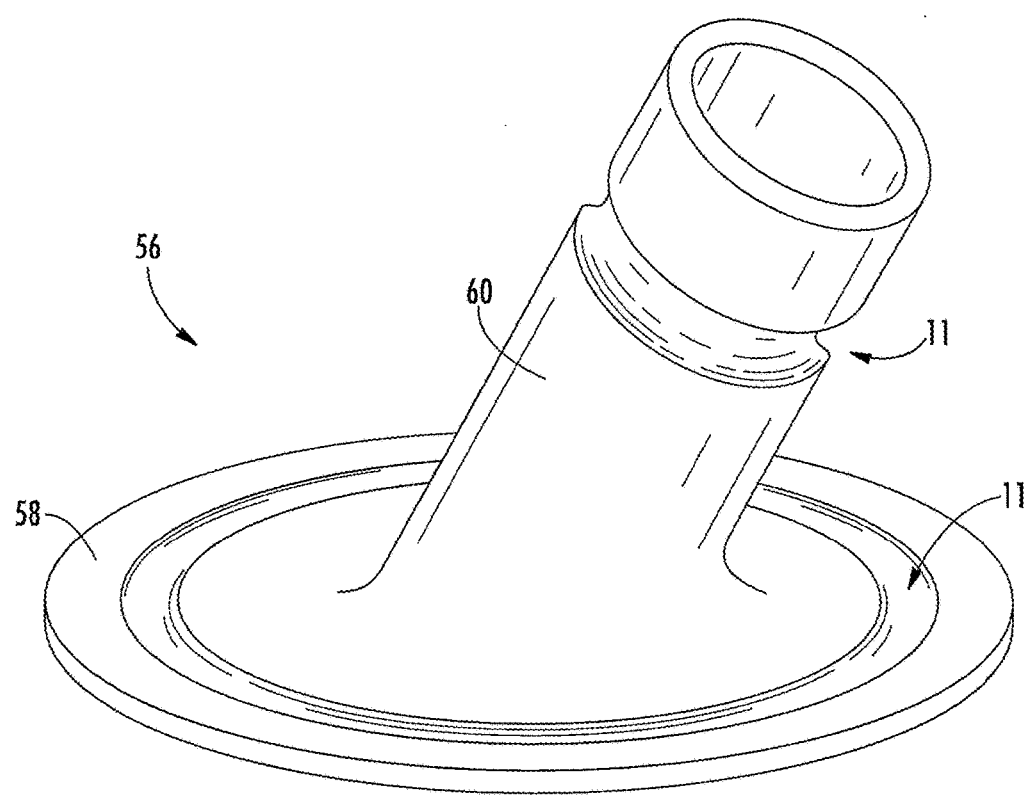
FIG. 4 is a perspective view of a brim-style sealing member used with the embodiment of FIG. 2 and configured for installation at a wye-junction prior to installation within a pipe.

The sealing member 56 has an inner surface and an outer surface. The outer surface is adapted to be positioned against the inner wall of a pipe or manhole. The outer surface includes one or more channels 11 adapted to receive a thick viscous fluid such as a semi-liquid. The semi-liquid may be a hydrophilic or hydrophobic grout or paste (collectively "the semi-liquid"). The channels 11 includes one or more sidewalls but no crown/top so that the material in the channel 11 can be exposed to and seal against the wall of the underground structure. In embodiments where the semi-liquid is hydrophilic, the hydrophilic semi-liquid swells in response to being exposed to water or other liquid. In specific, the hydrophilic semi-liquid expands outwardly and inwardly in a radial direction to effectively seal the area between the liner assembly 14 and the juncture between the main pipe line 50 and lateral pipe line 52. As shown in FIGS. 3 and 4, the sealing member has a channel 11 in the flange portion 58 adapted to engage the main pipe 50 near its intersection with the lateral pipe 52 and another channel 11 in the tubular portion 60 adapted to engage the inner diameter of the lateral pipe 52. In other embodiments the sealing member 56 may only have one of the two channels 11.

The sealing member 56 is made from a material that that it is inflexible enough to generally retain the shape and depth of the channel 11 as the liner assembly 14 and/or bladder assembly 16 is expanded and pressed against the sealing member 56. This helps prevent the semi-liquid from being expelled or dispersed from the channel 11 even as pressure is applied to the inner surface of the sealing member 56 from the expanding bladder or liner. The sealing member 56 may be a single, unitary piece that may be made by a vulcanization or extrusion processes. Such methods include molding or extruding polymeric material to form the channel. Other methods of forming the sealing member 56 include casting or molding methods, including but not limited to resin casting, injection molding, or extrusion molding.

FIG. 2 shows the repair assembly 10 moved within the main pipe line 50 adjacent the lateral pipe line 52. The launcher device opening 46 is registered with a junction between a lateral pipe line 52 and the main pipe line 50. This alignment may be done with a TV camera (not shown). The semi-liquid 29 may be introduced into the channels 11 by any suitable method, including injection, before the launcher device is deployed or it may be dispensed into the channels 11 after the launcher device is positioned at the junction between the pipes 50, 52. The lateral bladder tube 36 and the lateral liner tube 40 are contained within the launcher device cavity 48. It should be noted that the lateral liner tube 40 and tubular portion 60 of the sealing member 56 extend within the lateral bladder tube 36 in FIG. 2; whereas, the main liner member 38 (which may be a tube) and the flange portion 58 of the sealing member 56 remain outside the main bladder tube 34 on the exterior of the launcher device 12.

Air pressure is introduced in the cavity 48 through air hose 32, urging the liner assembly 14 into contact with the interior walls of the main pipe line 50 and the lateral pipe line 52. Continued air pressure causes the lateral bladder tube 36 and the lateral liner tube 40 to invert outwardly through the launcher device opening into the lateral pipe line 52 from the position shown in FIG. 2 to the position shown in FIG. 2a. While air is the preferred pressurized material, other gasses or fluids may be used. It should be noted that this inversion process causes the lateral liner tube 40 to be placed on the outside of the bladder tube 36 once the inversion is complete, as shown in FIG. 2a. In this position, the sealing member 56 is positioned between the main liner assembly 14 and the interior walls of the main pipe line 50 and between the lateral liner assembly 16 and the interior walls of the lateral pipe line 52. The opening in the channel 11 is facing the pipeline. Pressure within cavity 48 is maintained until the liquid hardenable material, preferably a resin activated with a catalyst, cures and hardens. This results in the liner assembly 14 assuming a rigid configuration, forming a lining to the lateral pipe line 52 and the main pipe line 50.

The ground water, as designated by the droplets in FIG. 2a, can seep towards the hydrophilic sealing member 56. However, upon encountering the sealing member 56 and/or the semi-liquid 29 in the channel 11, the water causes the sealing member 56 and/or the semi-liquid 29 within the channel 11 to expand in both a radial inward direction and a radial outward direction. This causes the sealing member 56 and the semi-liquid 29 to form a water tight seal between the T-shaped or Y-shaped liner assembly 14 and the interior walls of the main pipe line 50 and/or the lateral pipe line 52.

The embodiment described above is intended for use with an inversion-type application wherein the lateral bladder tube 36 and the lateral liner tube 40 invert outwardly into the lateral pipe line 52, however, those skilled in the art will appreciate that the sealing member 56 can also be used in pull-in-place applications. In a pull-in-place application, the sealing member 56 can be threaded down the lateral liner tube 40 to the juncture between the main liner member 38 and the lateral liner tube 40. In such a pull-in-place application, it is less important that the sealing member 56 be attached to the liner assembly 14, as the sealing member 56 will tend to stay in proper position as the lateral bladder tube 36 and lateral liner tube 40 are moved through the main pipe line 50 and ultimately into the lateral pipe line 52 while at the same time the main bladder tube 34 and main liner member 38 are moved along the main pipe line 50 to a position adjacent the opening to the lateral pipe line 52.

Figure 5:
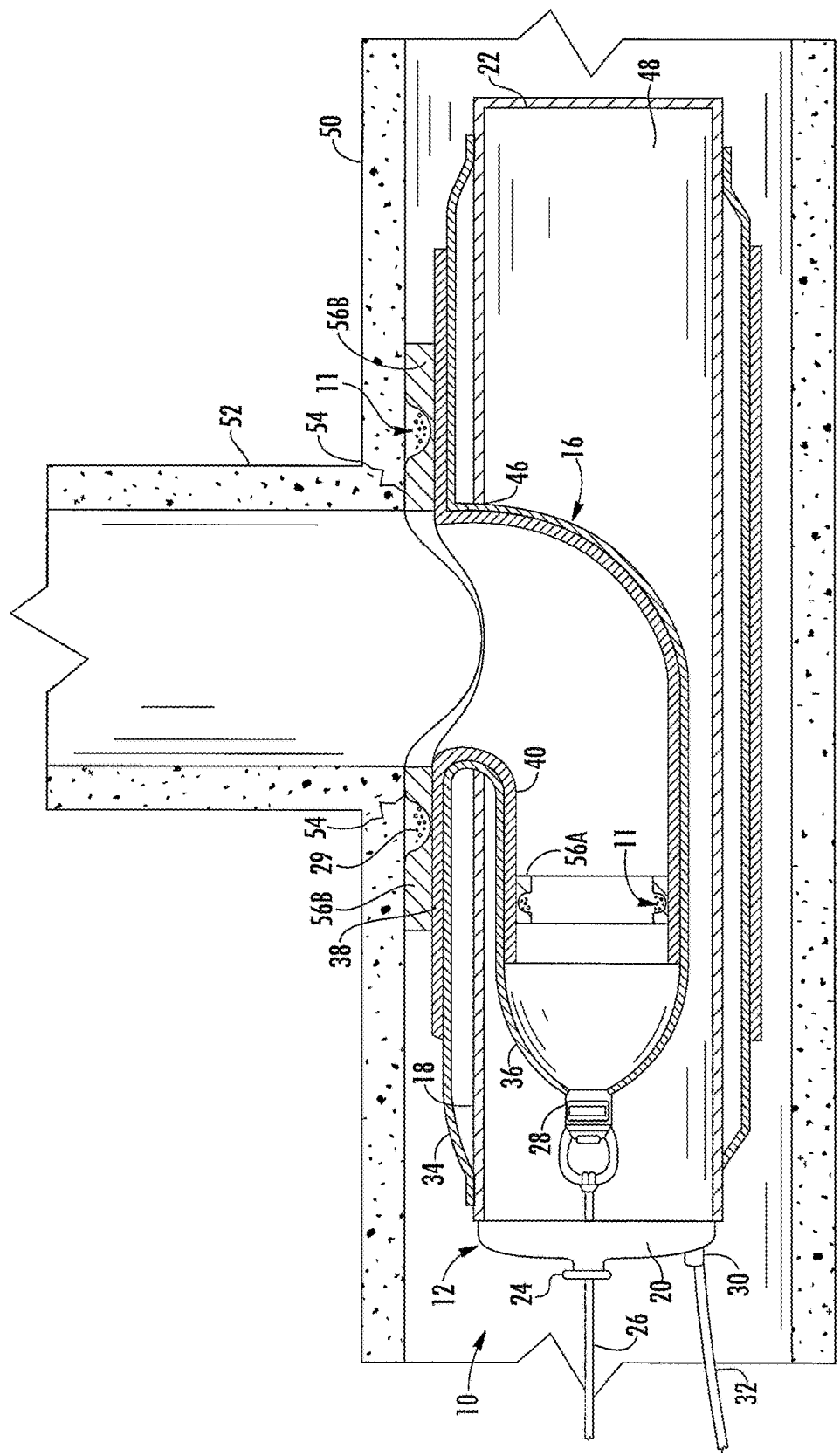
FIG. 5 is a sectional view of a main pipe line and a lateral pipe line showing an embodiment of the present invention where a band-style sealing member has a channel adapted to receive a semi-liquid such as a hydrophilic or hydrophobic paste or grout.
Figure 6:
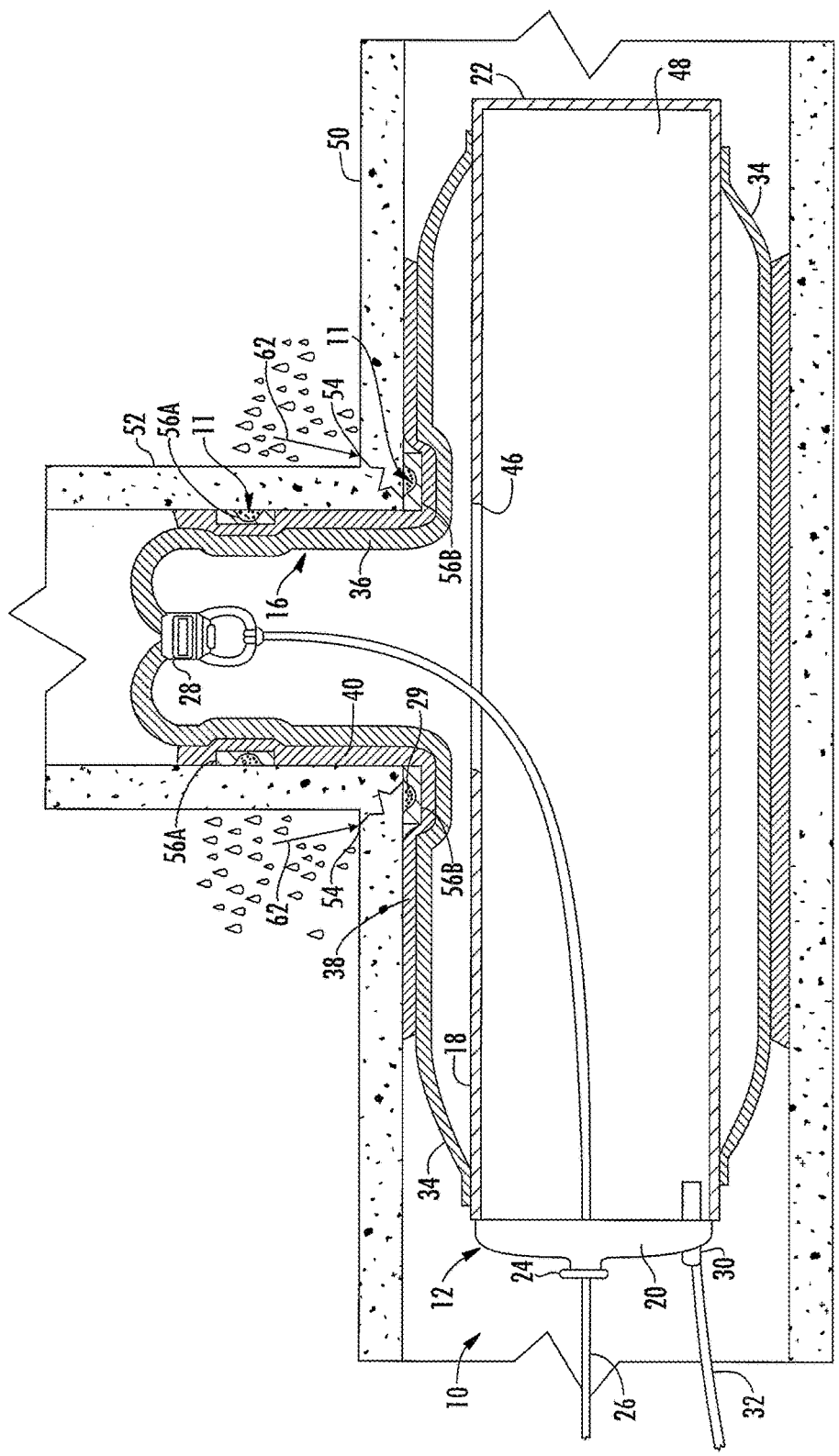
FIG. 6 is a view similar to FIG. 5, but showing the assembly in its inflated position.
Figure 10:
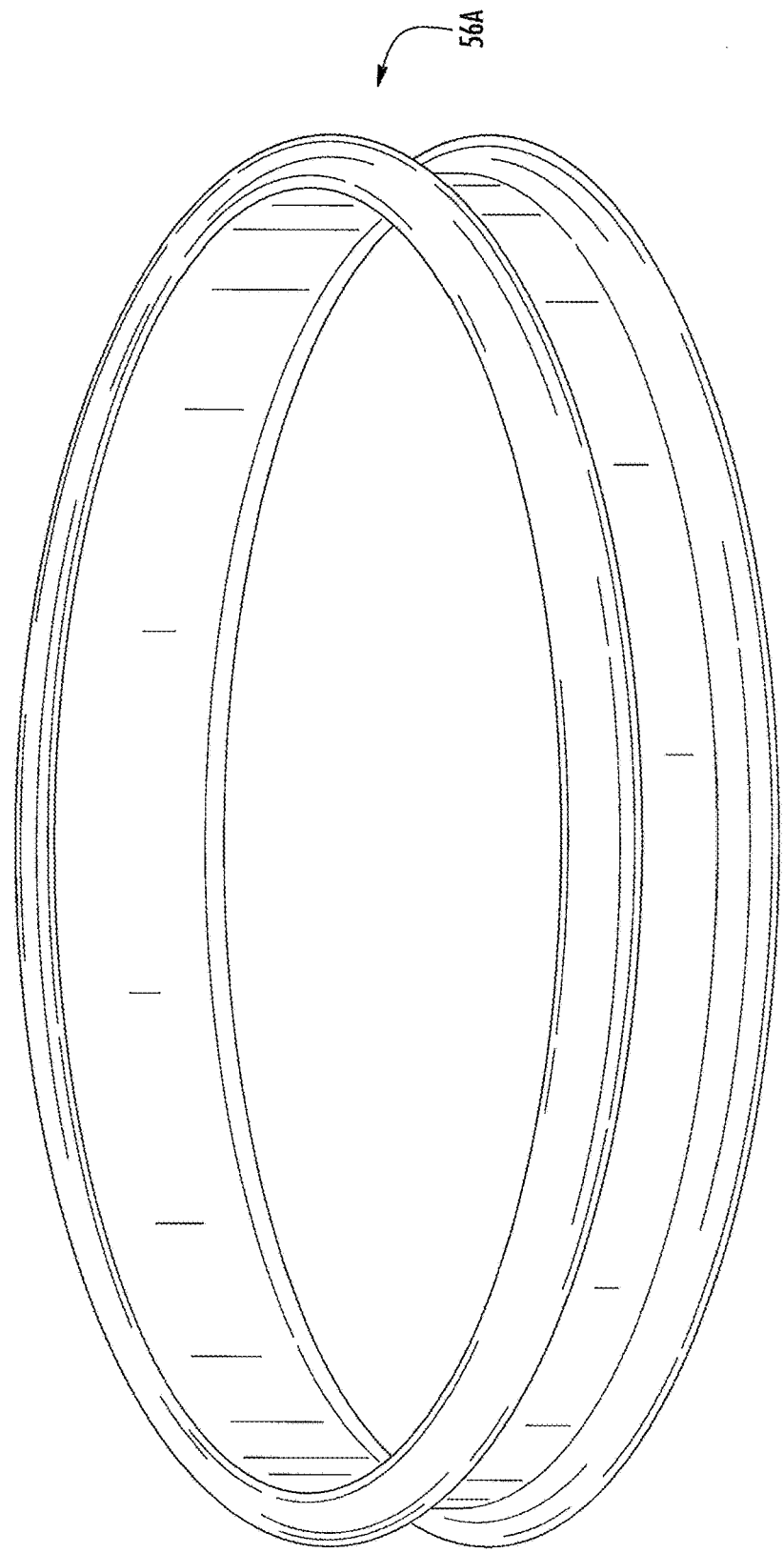
FIG. 10 is a perspective view of an embodiment of the sealing member having a channel adapted to receive a semi-liquid such as a hydrophilic or hydrophobic paste or grout.
Figure 11:
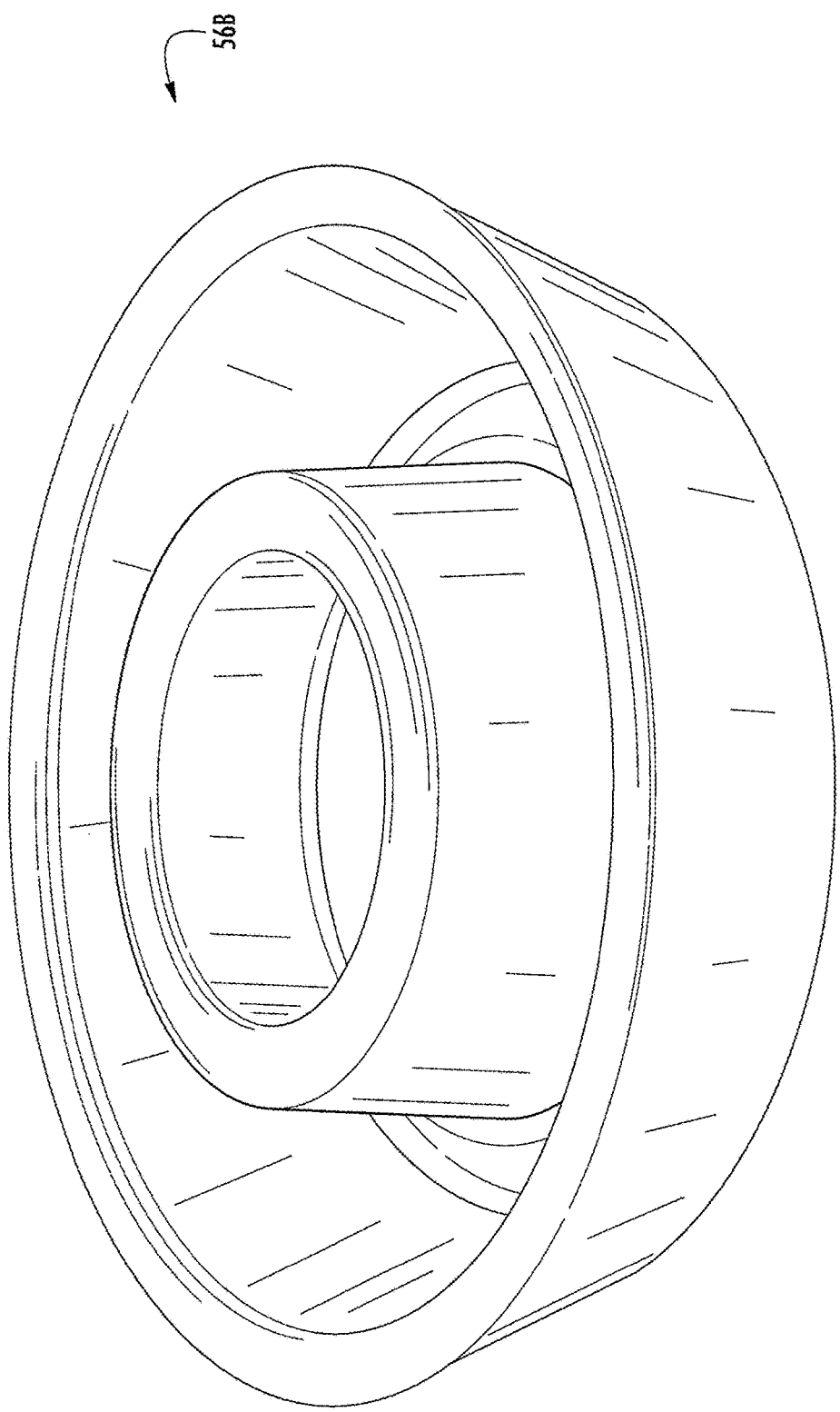
FIG. 11 is a perspective view of an embodiment of the sealing member having a channel adapted to receive a semi-liquid such as a hydrophilic or hydrophobic paste or grout.

FIGS. 5 and 6 illustrate an alternative embodiment of the present invention wherein the sealing members 56A, 56B includes properties and features similar to the sealing member 56 described above, however, in this embodiment the sealing members 56A, 56B are a ring-shaped band having a channel 11 adapted to receive the semi-liquid 29. The sealing member 56A, 56B may be made from any suitable material, including a hydrophilic material or like impermeable compressible material. As shown in FIGS. 5 and 6, a first sealing member 56B is positioned on the main liner member 38 and extends around the juncture between the main liner member 38 and the lateral liner tube 40. The sealing member 56B is shown in FIG. 11 wherein the opening in the channel 11 is adapted to face upward toward the top wall of the main pipe 50 around the junction with the lateral pipe 52. A second sealing member 56A is combined with the lateral liner tube 40 and adapted to be positioned with its channel 11 facing the inner wall of the lateral pipe 52. An exemplary second sealing member 56A is shown in FIG. 10 wherein the opening in the channel 11 is adapted to face outward toward the circumference of the lateral pipe 52. This type of sealing member 56A may be made from a molded piece of plastic similar to a flexible plastic c-channel or j-channel members used in vinyl house siding applications. The embodiment is shown as having both sealing members 56A, 56B, however, in other embodiments only one of the two sealing members 56A, 56B is used.

In applications where the lateral liner tube 40 is inverted into the lateral pipe line 52, it is preferred that the sealing member 56B is attached to the main liner member 38 to secure the sealing member 56B in place. The sealing member 56B can be attached by means of stitching, stapling, or by use of an adhesive or similar attachment means. The liner assembly is saturated with resin, then the semi-liquid 29 is introduced in the channel 11, then the assembly is placed in the pipeline.

Figure 9:
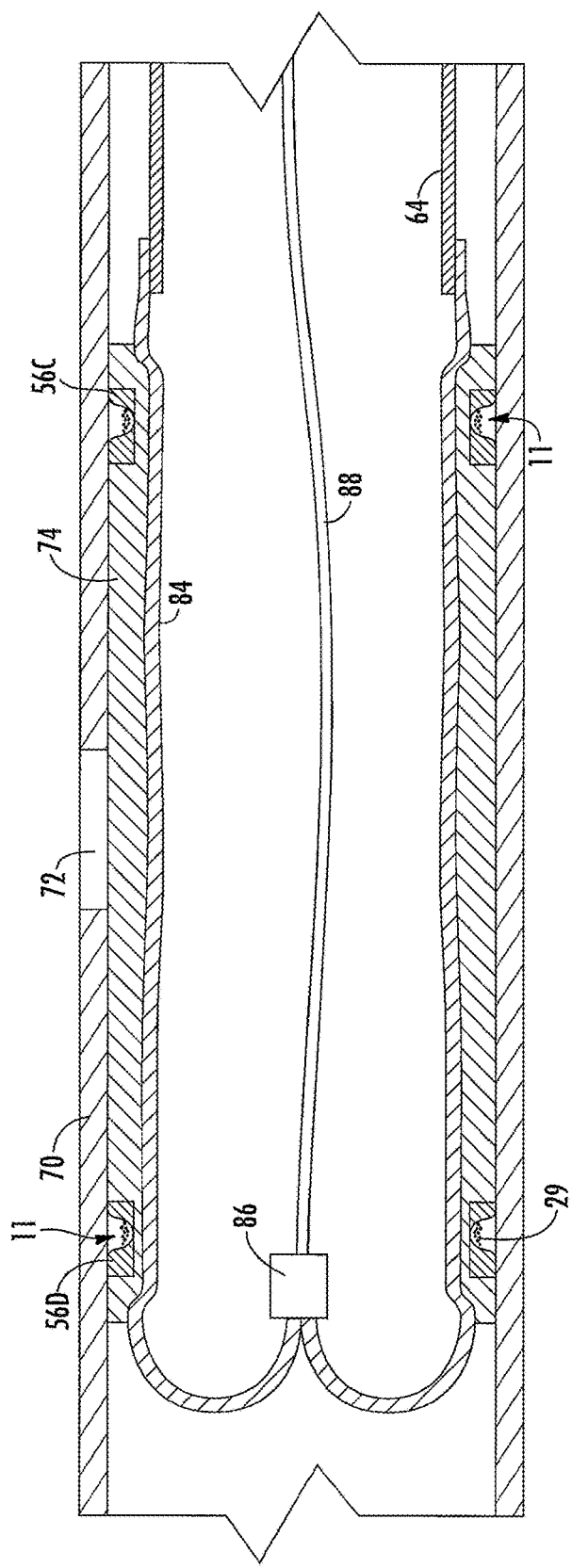
FIG. 9 is a sectional view similar to FIG. 8, showing the liner in a fully inverted position.

FIGS. 7, 8 and 9 illustrate another embodiment wherein sealing members 56C, 56D such as hydrophilic seals or bands can be positioned on opposite sides of a damaged portion 72 of a pipe line through an inversion-style lining technique. FIG. 7 illustrates a singular pipe 70 having a damaged portion 72. A launcher device 64 houses a liner tube 74 and a bladder tube 84 and is positioned in the pipe 70. About the interior lining surface of the liner tube 74 is a first sealing member 56C such as a hydrophilic band or seal and a second sealing member 56D such as hydrophilic band or seal are spaced apart so as to be located on opposite sides of the damaged portion 72 of the pipe 70 when the bladder tube 84 and liner tube 74 are inverted. The first and second sealing members 56C, 56D are attached to the interior lining surface of the liner tube 74 by stitching, stapling, by use of an adhesive or other suitable attachment means. The sealing members 56C, 56D include properties and features similar to the sealing members described above and similarly include a channel 11 adapted to receive a semi-liquid 29 such as a hydrophilic or hydrophobic paste or grout. The sealing members 56C, 56D are similar to the sealing member 56A shown in FIG. 10.

FIG. 8 shows the liner tube 74 and the bladder tube 84 is a partially inverted position. FIG. 9 shows the liner tube 74 and the bladder tube 84 fully inverted wherein the liner tube 74 is positioned at the damaged portion 72 and the first and second hydrophilic bands or seals 56C, 56D are located on opposite sides of the damaged portion 72 of the pipe 70. In these instances where the lining begins a significant distance away from the launcher device, the bladder tube 84 acts as a positioning tube with the liner tube 74 positioned accordingly inside the bladder tube 84, so that the liner tube 74 does not invert until it reaches the damaged portion 72 of the pipe 70.

The liner tube 74 comprises a layer of felt-like material which is impregnated with a liquid material capable of curing and hardening and may have a polymer outside layer or coating. The bladder tube 84 is inside the liner tube 74 after inverting and includes a closed end 86 and a line 88 extending outwardly there from. Air or fluid is introduced into the interior of bladder tube 84 to urge the bladder tube 84 radially outwardly so as to urge the liner tube 74 into contact with the pipe 70 being repaired.

Figure 12:
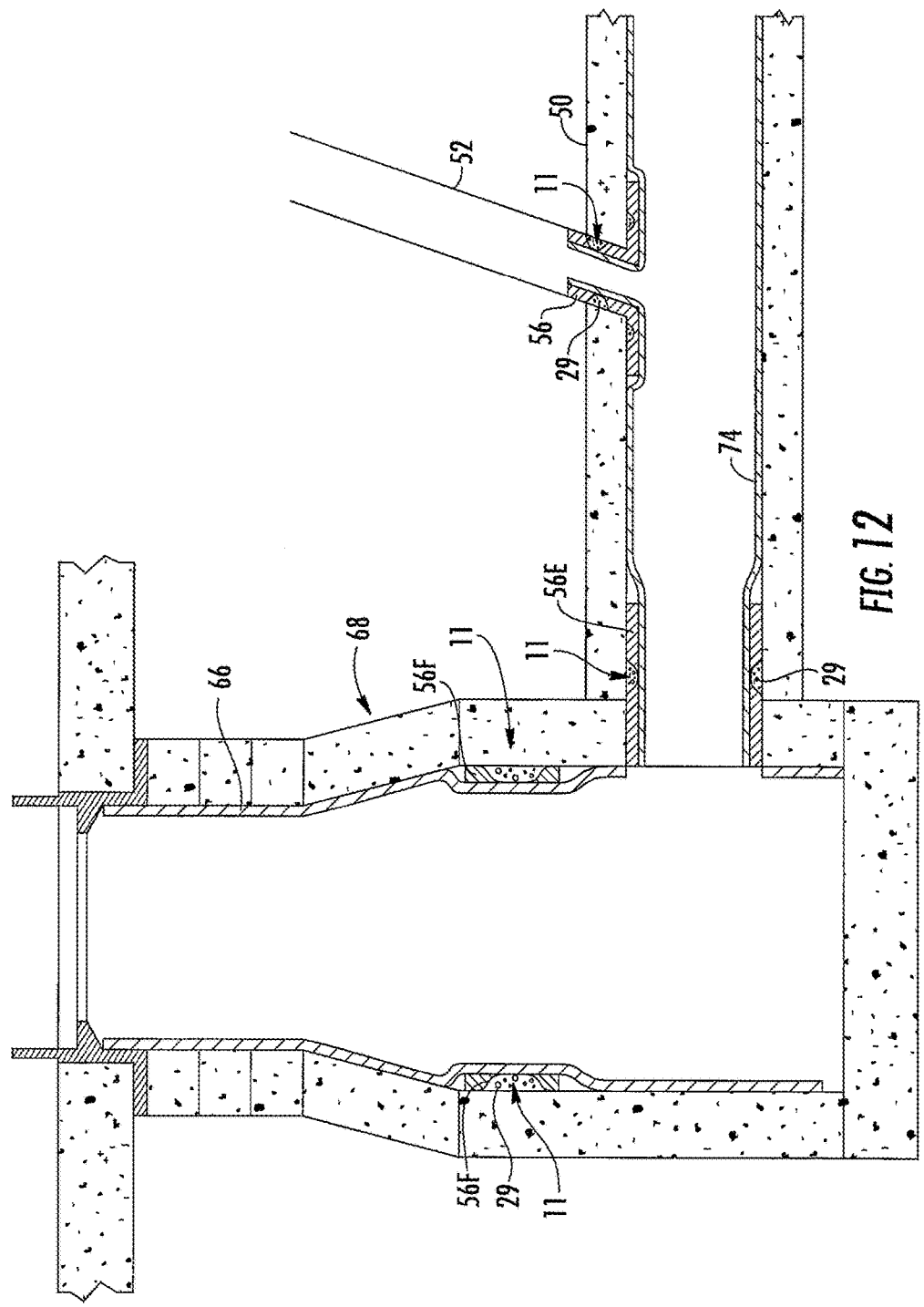
FIG. 12 is a sectional view of a sewer system including a manhole, main pipe, and lateral/service pipes illustrating where a first sealing member is placed at the intersection of the main pipe and the lateral/service pipe, a second sealing member is placed at the junction of the main pipe and the manhole, and a third sealing member is placed within the manhole at areas prone to water infiltration.
Figure 13:
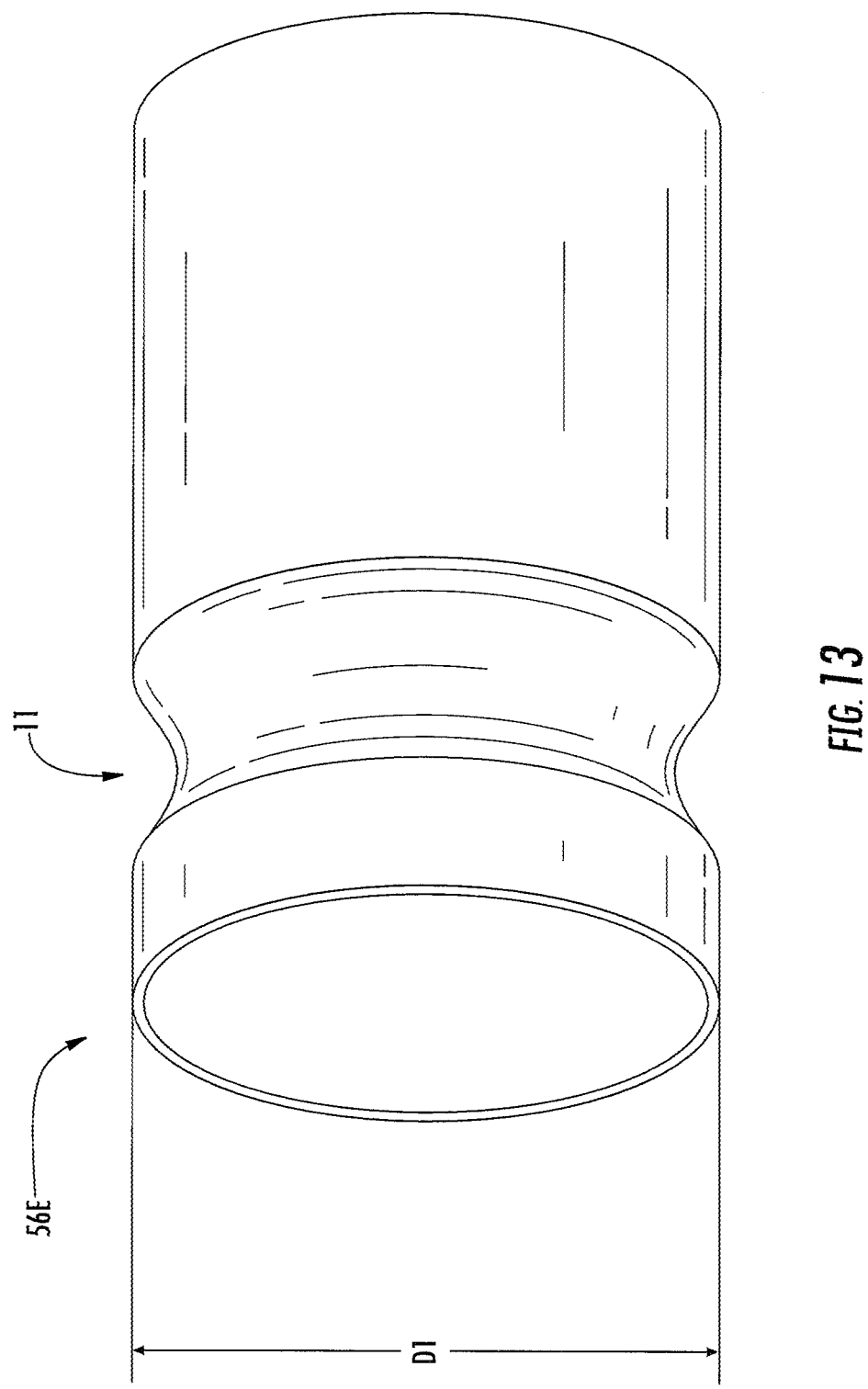
FIG. 13 is a perspective view of an embodiment of a sleeve-style sealing member having a channel adapted to receive a semi-liquid such as a hydrophilic or hydrophobic paste or grout.
Figure 14:
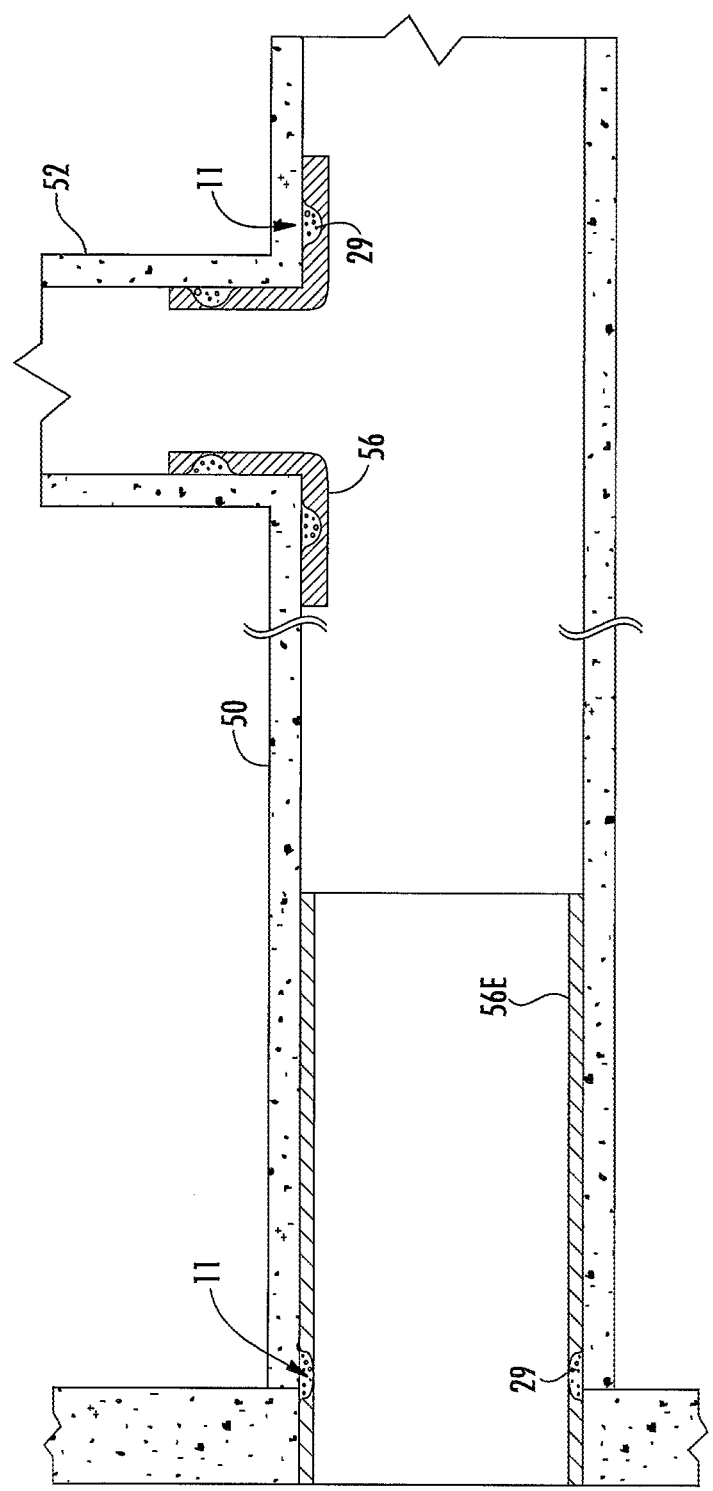
FIG. 14 is a sectional view of a sewer system including a manhole, main pipe, and lateral/service pipes illustrating where a first sealing member is placed at the junction of the main pipe and the lateral/service pipe and a second sealing member is placed at the junction of the main pipe and the manhole.
Figure 15:
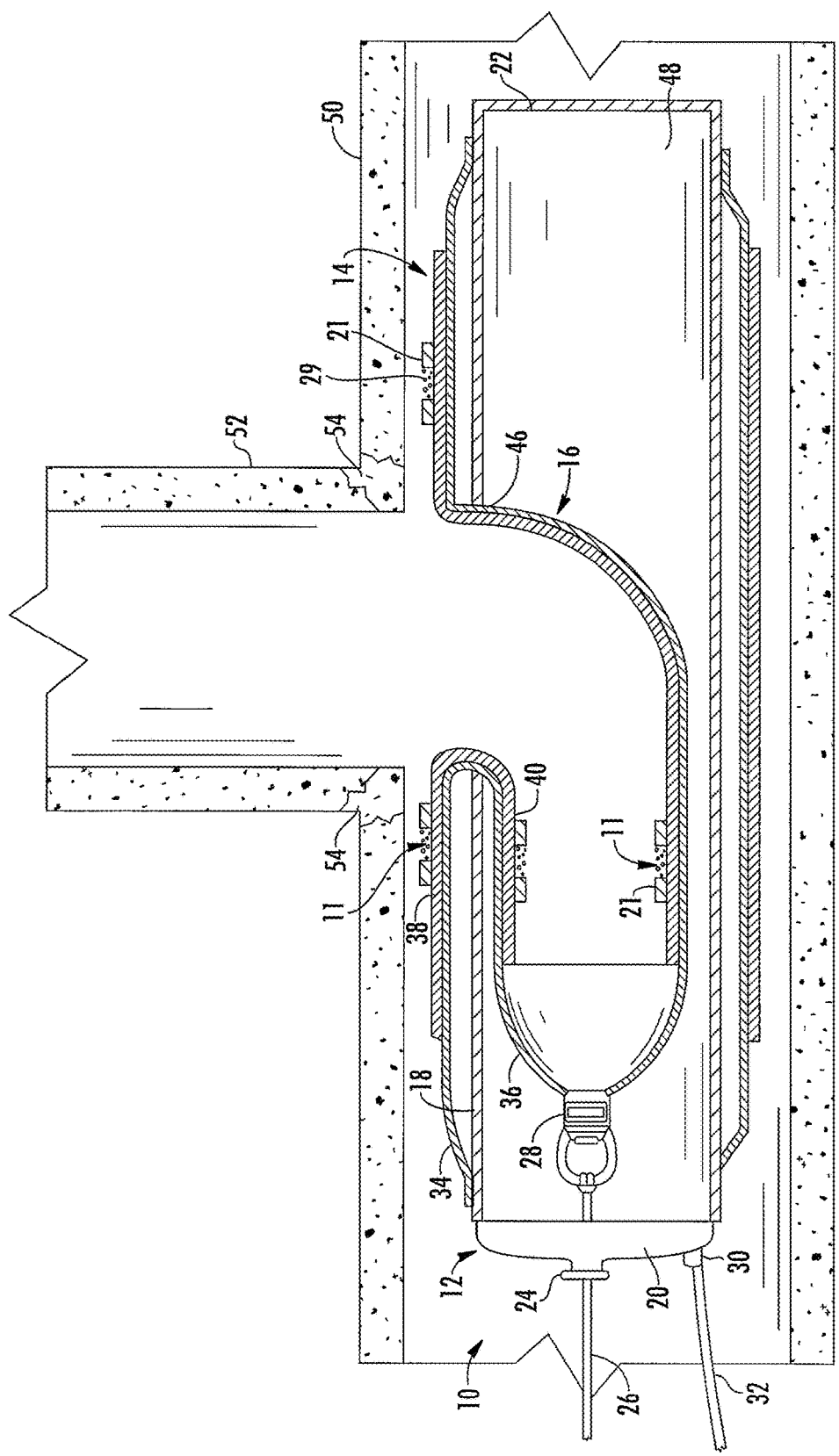
FIG. 15 is a sectional view of a main pipe line and a lateral pipe line showing an embodiment of the present invention wherein a liner assembly has a channel adapted to receive a semi-liquid such as a hydrophilic or hydrophobic paste or grout.
Figure 15A:
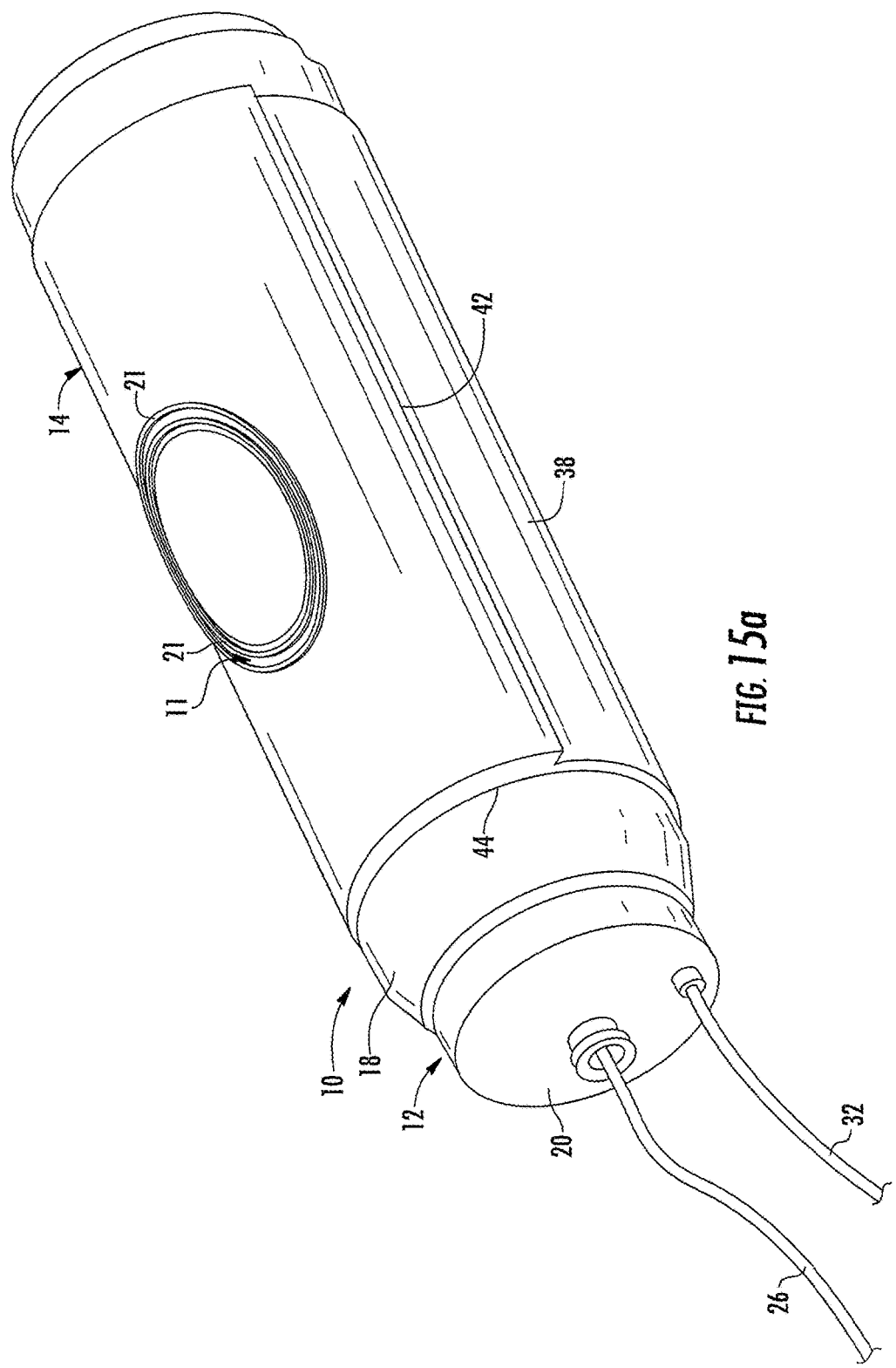
FIG. 15a is a perspective view of the embodiment of FIG. 15 showing the extra layers of liner material forming the channel in the liner.
Figure 16:
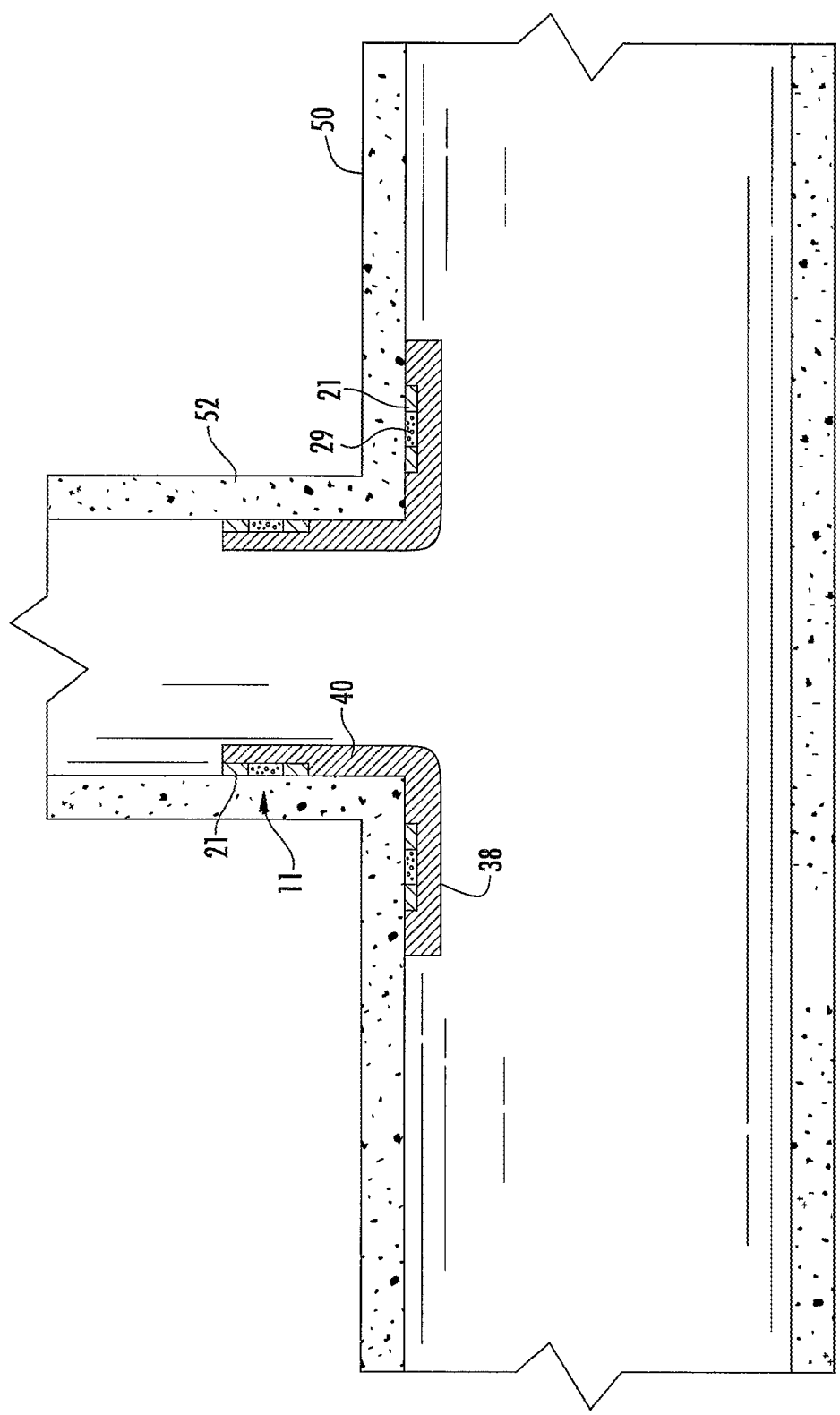
FIG. 16 is a sectional view of the embodiment of FIG. 15 wherein the liner assembly is shown installed at a junction of a main sewer pipe and a lateral sewer pipe.
Figure 17:
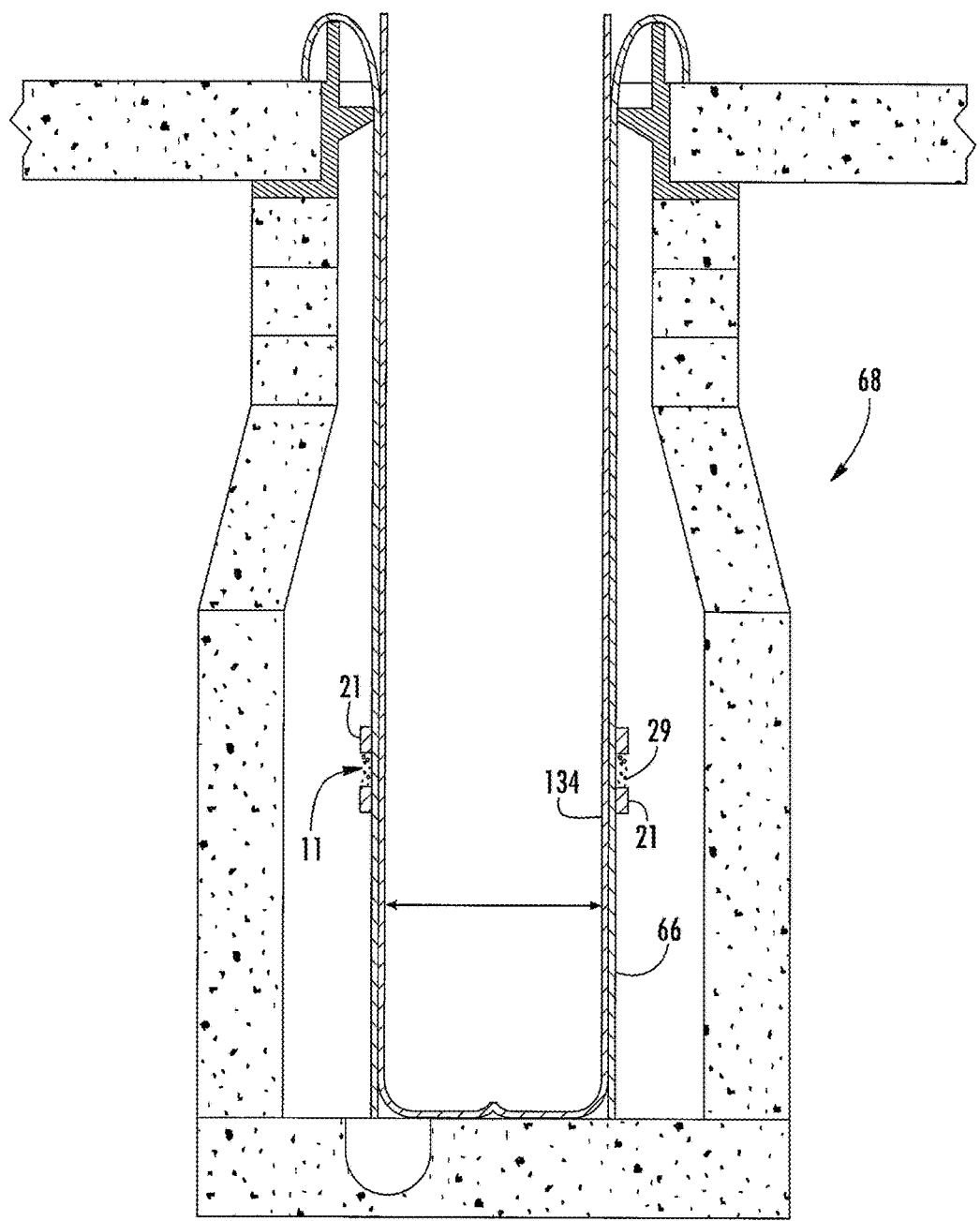
FIG. 17 is a sectional view of a liner assembly positioned in a manhole wherein a liner assembly has a channel adapted to receive a semi-liquid such as a hydrophilic or hydrophobic paste or grout.

FIGS. 12-14 show an embodiment where a sealing member 56E, 56F is used inside a manhole and/or at the junction of a manhole and a pipe. The sealing member 56E used at the junction between the pipe 50 and the manhole 68 may be a tubular sleeve liner like the one shown in FIG. 13. A feature of the sealing member 56E is that the material comprising the sealing member 56E may be of such a hardness that the sealing member 56 is be able to maintain its original shape within the structure to be rehabilitated, such as a manhole 68 or main pipe 50. For certain materials, it is possible retain the sealing member 56E in place without the use of a mechanical fastener. As such, the sealing member 56E may be considered to be self-supporting within the pipe or other structure in such embodiments. Another feature of the sealing member 56E is that outer diameter D1 is approximately equal to a diameter of the structure into which it is to be included, i.e. the end of a buried sewer pipe 50. The same concept is applied to manholes 68 or other structures, as the sealing member 56F may be formed or adjusted in shape or diameter to conform to the inner profile of the manhole 68 to be lined.

Similar to the embodiments described above, a resin impregnated liner 74 may be positioned in the pipeline 50 over the sealing member 56E. The main liner 74 is pressed against the wall of the main pipe 50 and the inner wall of the sealing member 56E and/or mechanical fastener. In some embodiments the main liner 74 has a fluid-impermeable coating on one side, allowing the main liner 74 to inflate without the use of a bladder. In other embodiments an inflatable bladder (not shown) is used to help position the liner 74 and press the liner against the wall of the pipe 50. There are several methods that may be employed to use the inflatable bladder. The inflatable bladder may be inverted into the main pipe 50 after the main liner 74 is already within the main pipe 50; the inflatable bladder may be inverted into the main pipe 50 along with the main liner 74; or the inflatable bladder may be may be pulled into place by an operator and subsequently inflated by air or another fluid.

FIG. 12 is a view showing the pipe system after the manhole liner 66 and main liner 74 has cured. (The manhole embodiment is described in more detail below). This figure shows that multiple embodiments described above may be used in combination to help seal the various locations of underground structures. After the main liner 74 is pressed against the walls of the main pipe 50, the resinous material is allowed to cure and harden, holding the sealing member 56E in place between the main liner 74 and the main pipe 50. Even if the end of the main liner 74 near the manhole 68 were to shrink, the sealing member 56E acts to fill the annular space between the main liner 74 and the main pipe 50. Since the sealing member 56E includes a channel 11 filled with a semi-liquid 29 such as a hydrophilic or hydrophobic paste or grout, the semi-liquid 29 in the channel 11 of the sealing member 56E will expand in the presence of water and/or extrude through voids or cracks in the main pipe 50, thus creating a full compression seal in the annular space between the main liner 74 and the main pipe/manhole junction.

In operation, the sealing member 56E works as follows. An assembly is provided, comprising a sealing member 56E having a proximal end and an outer diameter D1 approximately equal to a main pipe diameter; a mechanical fastener; and a main liner 74 impregnated with a resinous material capable of curing and hardening. The sealing member 56E is placed into a strained conformation so that the outer profile of the sealing member is reduced to fit inside of a main pipe 50. The sleeve is placed into a main pipe 50 such that the proximal end of the sealing member 56E is at the end of the main pipe 50 adjacent a junction of a manhole 68 and a main pipe 50. Once placed within the main pipe 50, the sleeve is allowed to expand back into its initial tubular conformation. The sealing member 56E may have a relatively tight fit within the pipe 50, as the outer diameter of the sealing member 56E should have an outer profile that matches the inner profile of the pipe 50 once placed against the pipe wall. An operator then secures the sealing member 56E against the wall of the main pipe 50. A mechanical fastener (not shown) may be used to help secure the sealing member 56E. The main liner 74 is then inserted into the main pipe 50 and through at least a portion of the sealing member 56E. The main liner 74 is pressed against the inner wall of the sealing member 56E under pressure, and the resinous material is allowed to cure and harden. In situations where the main liner 74 has cured against the wall of the main pipe 50, the main liner 74 may be cut with a saw or the like at the junctions with service pipes in order to reinstate service to the main pipe 50.

Figure 18:
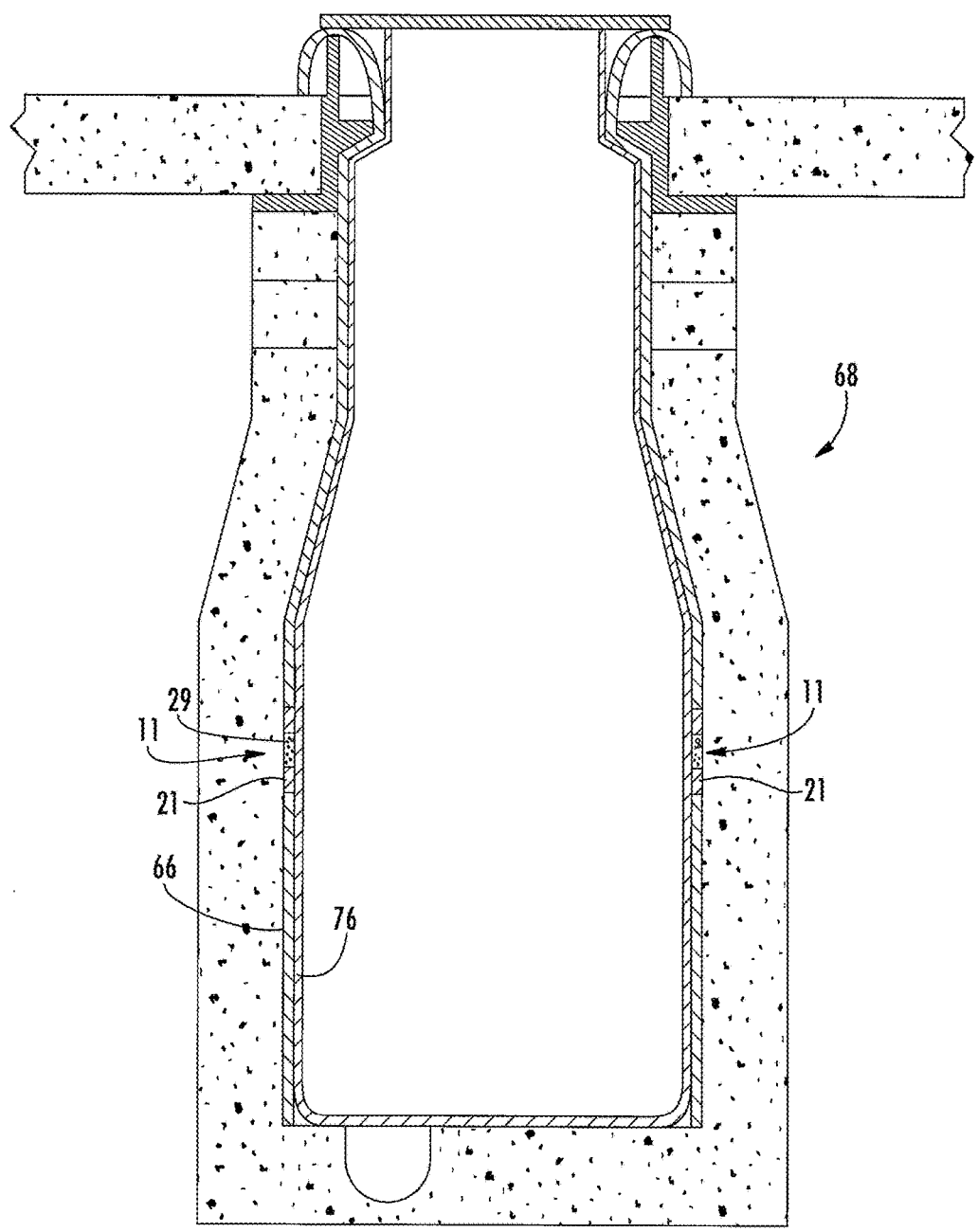
FIG. 18 is a sectional view of the embodiment of FIG. 17 wherein the liner assembly is shown installed in the manhole.
Figure 19:
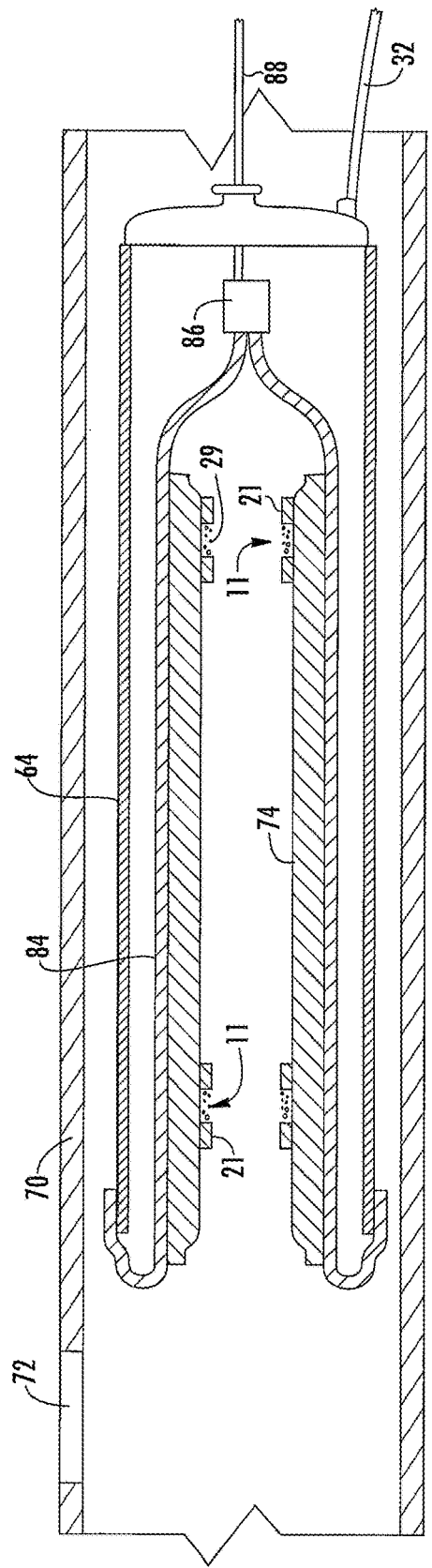
FIG. 19 is a sectional view showing an embodiment where a liner is positioned in a pipe, wherein a liner has a channel adapted to receive a semi-liquid such as a hydrophilic or hydrophobic paste or grout.
Figure 20:
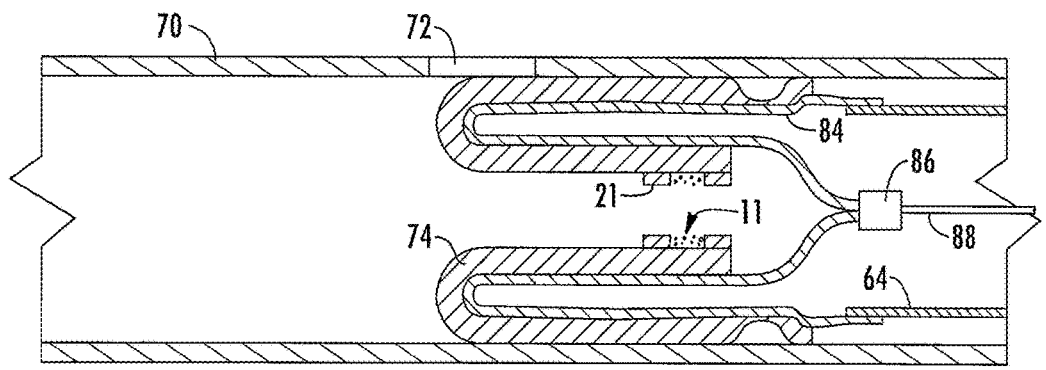
FIG. 20 is a sectional view of the embodiment of FIG. 19 where the liner is being everted from a launcher.
Figure 21:
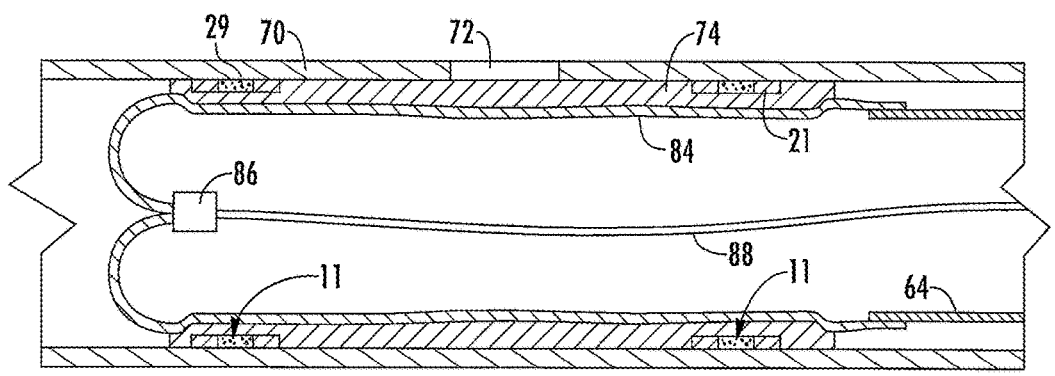
FIG. 21 is a section view of the embodiment of FIG. 19 where the liner is fully everted.

The sealing member(s) 56F used in the manhole 68 may be a ring or band, similar to sealing member 56A shown in FIG. 10. The sealing member 56F is placed in the manhole 68 then a manhole liner 66 (see FIG. 12) impregnated with a resinous material capable of curing and hardening is placed into the manhole over the sealing member 56F. The manhole liner 66 is pressed against the walls of the manhole 68 and the resinous material is allowed to cure and harden. A bladder 76 may be used to help press the manhole liner 66 against the walls of the manhole 68. The manhole bladder 76 is shown in FIG. 18. The cured manhole liner 66 is cut with a saw or the like around the junctions with other pipes, such as main pipes, to reinstate service to the manhole. After installation of the sealing member 56F, the main liner 74, and optionally the manhole liner 66, water can enter the annular space between the liners and the main pipe and/or manhole. The semi-liquid 29 in the channel 11 of the sealing member 56E, 56F may expand and/or swell upon contact with water, forming a compression seal and extruding through voids or cracks in the main pipe and/or manhole.

FIGS. 15-21 show embodiments for repairing or sealing underground structures such as pipes and manholes, or the junction between two underground structures, where the sealing member is a portion of the liner. In other words, the channel 11 is formed in the liner material (i.e., a separate sealing member is not used). The channel 11 may be formed in any of the liners described in the preceding embodiments. The channel 11 in the liner may be formed by spacing apart two thicker bands or portions 21 of the liner to create a channel 11 therebetween. In one embodiment, the channels 11 may be formed by securing a first band 21 of liner/felt material to a first portion of the liner and a second band 21 of liner/felt material to a second portion of the liner. The two bands 21 are spaced a short distance apart to create a channel 11 therebetween. For example, the liner may be is a single layer of needle punched felt having a thickness of about six millimeters. Near the end of the liner two separate bands 21/pieces of felt, both having a thickness of about six millimeters and having a width of about two and one-half centimeters, and both attached to the liner spaced apart about one or two centimeters. These two bands of material 21 surround the entire liner tube and/or liner juncture. A channel 11 is created between the two bands 21 of felt/liner material. The bands 21 are flexible and easy to attach to the liner by use of either an adhesive, stitching, or flame bonding. The bands 21 may compress a little when pressure is applied to force the liner toward the pipe wall, however, the bands 21 will maintain the channel 11 space so the semi-liquid 29 is not exposed to the pressure and will not dispersed from the channel 11.

The invention also includes methods for using the assemblies set forth above for sealing underground structures such as a pipe, a manhole, or the junction between a pipe and an underground structure. The methods include providing the assembly required for the desired sealing location. In one embodiment, the liner assembly is impregnated with a liquid material capable of curing and hardening and may have a polymer outside layer or coating. After impregnation, the semi-liquid 29 is introduced into the groove(s) 11 in the sealing member. Then, the assembly is positioned within the pipe or manhole using inversion or pull-in-place methods. In some embodiments, the sealing member is placed in its desired position in the underground structure before the liner assembly is positioned. In other embodiments, the sealing member is secured to the liner assembly before the liner assembly is placed so that the liner assembly transports and positions the sealing member in its proper position. Air or fluid is introduced into the interior of liner assembly to urge the liner assembly radially outwardly so as to urge the liner and sealing member into contact with the underground structure being repaired. In some embodiments, a bladder assembly is used. In these embodiments, the bladder assembly is inflated to help position the sealing member and liner assembly against the wall of the structure as the resin in the liner cures and hardens. The bladder assembly may be removed from the pipe or manhole or it may remain in the structure after the liner has cured and hardened. After the assemblies are properly positioned, the liner cures and hardens.

The semi-liquid 29 placed in the groove(s) 11 is capable of swelling in response to being exposed to another liquid, such as water, and forms a seal between the manhole liner and the manhole wall. The pipe or manhole liner is placed against an inner wall of the sealing member.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:

1. An apparatus for repairing an underground structure, said apparatus comprising:
   a liner assembly comprising a main liner member and a lateral liner tube attached to the main liner member at a junction;
   a sealing member surrounding the liner assembly and including a flange portion disposed on the main liner member about the junction, the sealing member having an outer surface with a channel formed therein, the channel adapted to receive a semi-liquid;
   wherein the sealing member is made from a material inflexible enough to retain the channel under pressure.

2. The apparatus of claim 1 wherein the underground structure is one of a pipe, a manhole, a junction between a pipe and a manhole, and a junction between two pipes.

3. The apparatus of claim 1 wherein the semi-liquid comprises one of a hydrophilic and a hydrophobic material.

4. The apparatus of claim 1 wherein the semi-liquid comprises one of a paste and a grout.

5. The apparatus of claim 1 further comprising a bladder assembly.

6. The apparatus of claim 1 wherein the sealing member is one of a gasket, a band, and a sleeve.

7. An apparatus for repairing a main pipe line a lateral pipe line connected thereto and in communication therewith to form a pipe junction, the apparatus comprising:
   a liner assembly of resin absorbent material comprising a main liner member and a lateral liner tube in communication with one another through a liner juncture;
   the main liner member being adapted to extend within the main pipe line and the lateral liner tube being adapted to extend within the lateral pipe line; and
   a sealing member having a channel in an outer surface, said sealing member adapted to receive a semi-liquid, wherein the sealing member includes a tubular portion having a first end and a second end and a flange portion extending outwardly from one of the first and second ends of the tubular portion, wherein the flange portion is disposed between the main liner member and the main pipe line and the tubular portion is disposed between the lateral liner tube and the lateral pipe line;
   wherein the sealing member is made from a material inflexible enough to retain the channel under pressure as the sealing member is compressed between the liner assembly and at least one of the main pipe line and the lateral pipe line.

8. The apparatus of claim 7 wherein the main liner member is formed as a tube.

9. The apparatus of claim 7 further comprising a bladder assembly comprising a main bladder tube and a lateral bladder tube, the lateral bladder tube being adapted to extend within the lateral pipe line with the lateral bladder tube being inside the lateral liner tube and the lateral liner tube being between the tubular portion of the sealing member and the lateral bladder tube.

10. The apparatus of claim 7 wherein the underground structure is one of a pipe, a manhole, a junction between a pipe and a manhole, and a junction between two pipes.

11. The apparatus of claim 7 wherein the semi-liquid is one of a hydrophilic and a hydrophobic material.

12. The apparatus of claim 7 wherein the sealing member is a gasket.

13. The apparatus of claim 7 wherein the channel is in the flange portion of the sealing member.

14. The apparatus of claim 1 wherein the channel is in the flange portion of the sealing member.

* * * * *